(12) United States Patent
Kang et al.

(10) Patent No.: US 8,228,475 B2
(45) Date of Patent: Jul. 24, 2012

(54) LIQUID CRYSTAL DISPLAY AND METHOD OF MANUFACTURING THE SAME

(75) Inventors: Hoon Kang, Suwon-si (KR); Yong-Hwan Shin, Yongin-si (KR); Hong-Jo Park, Suwon-si (KR); Jae-Sung Kim, Yongin-si (KR); Yang-Ho Jung, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 549 days.

(21) Appl. No.: 12/499,325

(22) Filed: Jul. 8, 2009

(65) Prior Publication Data

US 2010/0053490 A1 Mar. 4, 2010

(30) Foreign Application Priority Data

Aug. 29, 2008 (KR) .................. 10-2008-0085112

(51) Int. Cl.
*G02F 1/1343* (2006.01)
(52) U.S. Cl. .......... 349/141; 349/48; 349/106; 349/110; 349/156
(58) Field of Classification Search .................. 349/48, 349/43, 38, 129, 106, 110, 138, 156, 141, 349/139, 111, 155
See application file for complete search history.

(56) References Cited

U.S. PATENT DOCUMENTS

| | | | |
|---|---|---|---|
| 4,767,194 A | 8/1988 | Heppke et al. | |
| 2004/0196425 A1 | 10/2004 | Hsieh et al. | |
| 2004/0212768 A1 | 10/2004 | Wu et al. | |
| 2004/0257514 A1 | 12/2004 | Hsieh et al. | |
| 2005/0259197 A1 | 11/2005 | Hirai et al. | |
| 2006/0091391 A1 | 5/2006 | Lee et al. | |
| 2006/0170846 A1 | 8/2006 | Ozawa | |
| 2006/0203151 A1 | 9/2006 | Kim | |
| 2006/0227273 A1 | 10/2006 | Shin et al. | |
| 2008/0129901 A1 | 6/2008 | You et al. | |
| 2009/0219478 A1* | 9/2009 | Park et al. | 349/155 |

FOREIGN PATENT DOCUMENTS

JP 2000338520 A 12/2000
(Continued)

OTHER PUBLICATIONS

European Search Report; Nov. 5, 2009; Application No. 09009097.8-2205.
62.2: Invited Paper: Fast Electro-Optical Switching in Polymer-Stabilized Liquid Crystalline Blue Phases for Display Application; SID 07 Digest; pp. 1737-1740 Hirotsugu Kikuchi; Yasuhiro Haseba; Takashi Iwata.

*Primary Examiner* — Thoi Duong
(74) *Attorney, Agent, or Firm* — Cantor Colburn LLP

(57) ABSTRACT

A liquid crystal display includes a first substrate, a gate line and first and second data lines disposed on the first substrate, a first thin film transistor connected to the gate line and the first data line, a second thin film transistor connected to the gate line and the second data line, a color filter disposed on the first substrate, a protrusion disposed on the color filter, a first pixel electrode including a first linear electrode disposed on the protrusion and connected to the first thin film transistor, a second pixel electrode including a second linear electrode disposed on the protrusion and connected to the second thin film transistor, a second substrate disposed facing the first substrate, and blue phase liquid crystal disposed between the first substrate and the second substrate.

22 Claims, 32 Drawing Sheets

FOREIGN PATENT DOCUMENTS

| | | |
|---|---|---|
| JP | 2003315788 A | 11/2003 |
| JP | 2004109794 A | 4/2004 |
| KR | 1020050075304 A | 7/2005 |
| KR | 1020050114129 A | 12/2005 |
| KR | 1020060032034 A | 4/2006 |
| KR | 1020060095467 A | 8/2006 |
| KR | 1020070087610 A | 8/2007 |

* cited by examiner

LIQUID CRYSTAL DISPLAY AND METHOD OF MANUFACTURING THE SAME

This application claims priority to Korean Patent Application No. 10-2008-0085112 filed in the Korean Intellectual Property Office on Aug. 29, 2008, and all the benefits accruing therefrom under 35 U.S.C. §119, the entire contents of which are incorporated herein by reference.

BACKGROUND OF THE INVENTION (a) Field of the Invention

The present invention relates to a display device. More particularly, the present invention relates to a display device using blue phase liquid crystal.

(b) Description of the Related Art

A liquid crystal display is one type of flat panel display that is widely used. The liquid crystal display includes two display panels in which a field generating electrode, such as a pixel electrode, and a common electrode is formed, and a liquid crystal layer interposed therebetween. The liquid crystal display generates an electric field in a liquid crystal layer by applying a voltage to a field generating electrode, thereby determining alignment of liquid crystal molecules of the liquid crystal layer and displaying images by controlling polarization of incident light.

In the liquid crystal display, because a transmittance of light is determined by an alignment state of a liquid crystal layer, in order to quickly change the alignment state, a relatively fast response speed of the liquid crystal layer is required.

A liquid crystal display using blue phase liquid crystal, in which a state of the liquid crystal exists between a nematic mode and an isotropic mode, has been developed. The blue phase liquid crystal has a relatively very fast response speed of about 3 micrometers (μm).

BRIEF SUMMARY OF THE INVENTION

When a liquid crystal display includes a liquid crystal display using blue phase liquid crystal, in which a state of the liquid crystal exists between a nematic mode and an isotropic mode, there may be challenges in operating and manufacturing the liquid crystal display. For example, there may be a problem where a required driving voltage of the liquid crystal is relatively very high, and light leakage occurs between the electrodes.

An exemplary embodiment of the present invention provides a liquid crystal display having advantages of improving picture quality by reducing a level of a driving voltage, and reducing or effectively blocking light leakage between the electrodes.

An exemplary embodiment of the present invention provides a liquid crystal display including a first substrate; a gate line disposed on the first substrate and extending in a first direction, first and second data lines extending in a second direction and isolated from and intersecting the gate line, a first thin film transistor connected to the gate line and the first data line, a second thin film transistor connected to the gate line and the second data line, a passivation layer covering the first and second thin film transistors, a black matrix disposed on the passivation layer and disposed in a region corresponding to the gate line, the first and second data lines, and the first and second thin film transistors, a color filter disposed on the passivation layer and positioned at a region where the black matrix is not disposed, a protrusion disposed on the color filter, a first pixel electrode including a first linear electrode disposed on the protrusion and connected to the first thin film transistor, a second pixel electrode including a second linear electrode disposed on the protrusion and connected to the second thin film transistor, a second substrate disposed opposite to the first substrate, and blue phase liquid crystal disposed between the first substrate and the second substrate. Light is not transmitted through the first linear electrode and the protrusion, and light is not transmitted through the second linear electrode and the protrusion.

The protrusion may be made of the same material as that of the black matrix.

The first pixel electrode including the first linear protrusion, and the second pixel electrode including the second linear protrusion may be formed with an opaque conductor.

The liquid crystal display may further include a capping layer covering the black matrix and the color filter.

An opaque metal layer may be disposed under the protrusion and on the color filter.

The liquid crystal display may further include a capping layer covering the black matrix and the color filter, and disposed under the opaque metal layer.

The protrusion may have a cross-section of a bell shape, or one of a semicircular cross-section, a semi-oval cross-section, a triangular cross-section, and a trapezoidal cross-section.

A side surface of the protrusion may have a taper form.

Before an electric field is applied, the blue phase liquid crystal may have optically isotropic characteristics because disordered domains are arranged in a nano size, and when an electric field is applied, the blue phase liquid crystal may have optically anisotropic characteristics because liquid crystals are arranged in an electric field direction.

The first pixel electrode and the second pixel electrode may be electrically connected to the first thin film transistor and the second thin film transistor through first and second contact holes, respectively. The first contact hole may be formed in the color filter and the passivation layer and expose a drain electrode of the first thin film transistor. The second contact hole may be formed in the color filter and the passivation layer and expose a drain electrode of the second thin film transistor.

When a data voltage is applied to the first pixel electrode, a common voltage may be applied to the second pixel electrode.

When a data voltage is applied to the first pixel electrode, a voltage having polarity opposite to that of the data voltage and of a same magnitude as the data voltage may be applied to the second pixel electrode.

The protrusion and the first and second linear electrodes may be obliquely disposed relative to the gate line and the first and second data lines.

The protrusion and the first and second linear electrodes may be disposed in an angle of about 45° relative to the gate line.

A first polarizer and a second polarizer may be attached to an outside of the first substrate and the second substrate, respectively. The first polarizer and the second polarizer may have a transmissive axis, and the transmissive axis of the first polarizer and the transmissive axis of the second polarizer may have an angle of about 45° relative to the first linear electrode or the second linear electrode.

The liquid crystal display may further include a storage electrode line in parallel to the gate line and including a storage electrode.

The first pixel electrode may include a trunk portion, and a surface electrode corresponding to the first linear electrode and the storage electrode, and the first linear electrode may extend from the trunk portion and the surface electrode.

The second pixel electrode may include an inverse ⊏--shaped trunk portion and the second linear electrode, and the second linear electrode may extend from the inverse ⊏--shaped trunk portion.

An exemplary embodiment of the present invention provides a liquid crystal display including, a first substrate, a gate line disposed on the first substrate and extending in a first direction, first and second data lines extending in a second direction and electrically insulated from and intersecting the gate line, a first thin film transistor connected to the gate line and the first data line, a second thin film transistor connected to the gate line and the second data line, a passivation layer covering the first and second thin film transistors, a black matrix disposed on the passivation layer and disposed in a region corresponding to the gate line, the first and second data lines, and the first and second thin film transistors, a color filter disposed on the passivation layer and positioned at a region where the black matrix is not disposed, a protrusion disposed formed on the color filter and includes an organic film, a first pixel electrode including a first linear electrode disposed on the protrusion and connected to the first thin film transistor, a second pixel electrode including a second linear electrode disposed on the protrusion and connected to the second thin film transistor, a second substrate disposed opposite to the first substrate, and blue phase liquid crystal disposed between the first substrate and the second substrate. A refractive index in a specific state of the blue phase liquid crystal is the same as a refractive index of the protrusion.

A refractive index of the blue phase liquid crystal when the liquid crystal display displays black may be the same as a refractive index of the protrusion.

An exemplary embodiment of the present invention provides a method of manufacturing a display device. The method includes forming an organic film pattern by stacking and patterning an organic material on an insulation substrate, stacking a first layer on the organic film pattern and the insulation substrate, exposing the organic film and the first layer from a rear surface of the insulation substrate with ultraviolet rays using the organic film pattern as a mask, and patterning the first layer.

The organic film pattern may be hard-baked or a surface treatment of the organic film pattern may be performed.

The surface treatment may be performed with one of N-methylpyrrolidone (NMP), which is a strong alkali organic solvent, metyl n-butyl ketone (MBK), which is an organic solvent for a resin, and acetone.

The first layer may have photosensitivity.

The method may further include stacking a photoresist on the first layer, and patterning the photoresist by developing after exposing the rear surface. The patterning of the first layer may include etching the first layer using the patterned photoresist as a mask.

An exemplary embodiment of a liquid crystal display according to the present invention has advantages of a driving voltage is reduced, and picture quality is improved by blocking light leakage between electrodes.

DETAILED DESCRIPTION OF THE INVENTION

Figure 1:
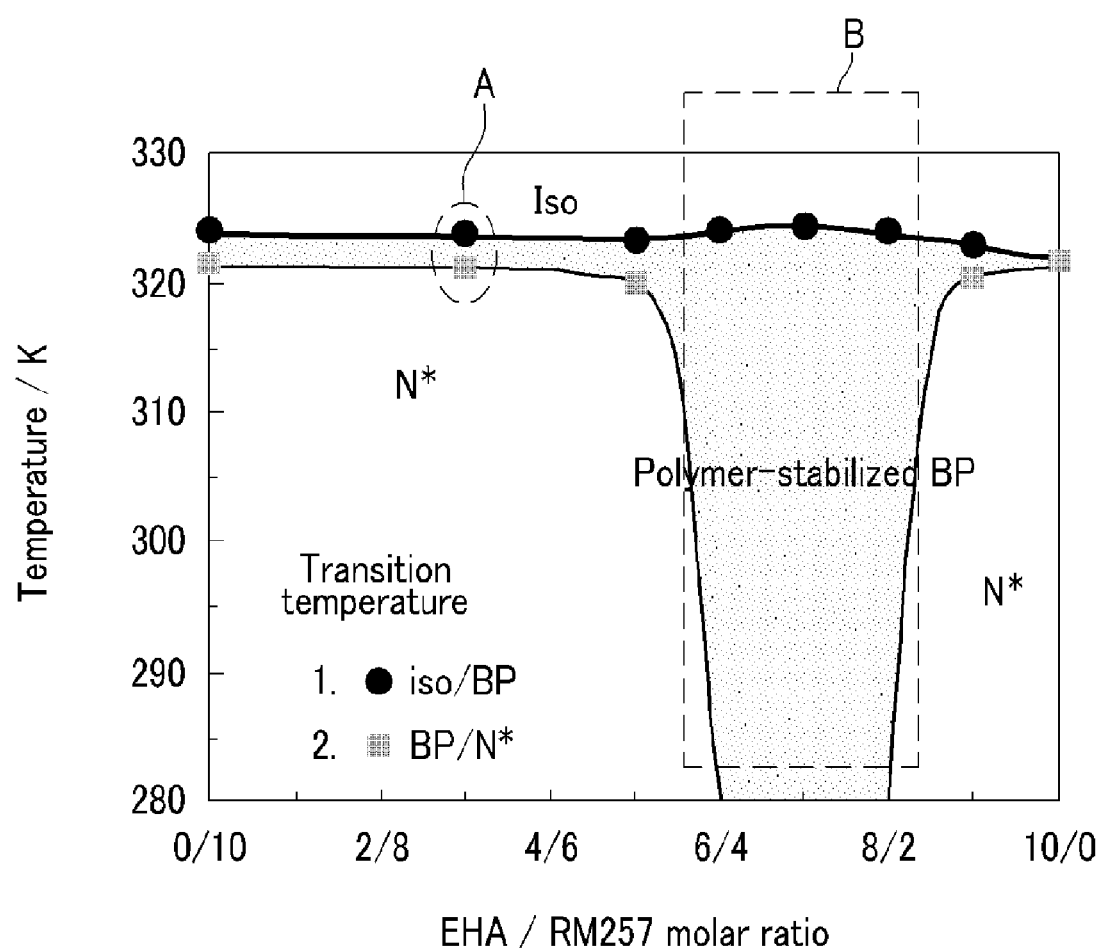
FIG. 1 is a graph illustrating an exemplary embodiment of a mixed ratio and a temperature of blue phase liquid crystal, according to the present invention.

The present invention will be described more fully hereinafter with reference to the accompanying drawings, in which exemplary embodiments of the invention are shown. The present invention is not limited to the exemplary embodiments, but may be embodied in various forms. In the drawings, the thickness of layers, films, panels, regions, etc., are exaggerated for clarity. Like reference numerals designate like elements throughout the specification. As used herein, the term "and/or" includes any and all combinations of one or more of the associated listed items.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "under," "above", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

Blue phase liquid crystal is described hereinafter with reference to FIG. 1.

FIG. 1 is a graph illustrating an exemplary embodiment of a mixed ratio and a temperature of blue phase liquid crystal according to the present invention.

The horizontal axis of FIG. 1 represents a mixed ratio of a material, and the vertical axis thereof represents a Kelvin temperature (K). In an exemplary embodiment of the present invention, as an addition material of liquid crystal, ethyl hexyl acrylate (EHA) and RM257 (a product name) are used.

When a material having chirality as a dopant is added to liquid crystal, the liquid crystal is changed to a nematic mode or an isotropic mode according to a temperature, and has a blue phase mode in a relatively narrow temperature range between the nematic mode and the isotropic mode. Because the blue phase mode has a narrow temperature range, it may be difficult to use the blue phase mode for a liquid crystal display. Accordingly, by adding a small quantity of a monomer to the liquid crystal, and then radiating UVfmf to the liquid crystal, blue phase liquid crystal is stabilized through polymerization. Thereafter, a liquid crystal display is manufactured using stabilized blue phase liquid crystal.

FIG. 1 shows a case where EHA and RM257 are used as a monomer. In FIG. 1, a region where "N*" is displayed has a nematic mode, a region where "Iso" is displayed has an isotropic mode, and a region where "BP" is displayed has a blue phase. A region A represents a region having a blue phase exists only in a relatively narrow temperature range. If a liquid crystal display is manufactured using materials from the region A, according to a use environment (particularly, a temperature) of the liquid crystal display, images may not be displayable, so that blue phase liquid crystal cannot be used for the liquid crystal display. However, when EHA and RM257 are added with a ratio of 6:4 to 8:2 and UV is radiated and stabilized (a case BP), blue phase liquid crystal exists in a relatively wide temperature range, and (stabilized) blue phase liquid crystal can be advantageously used as liquid crystal for the liquid crystal display.

In blue phase liquid crystal, because liquid crystals having an optical anisotropy are disorderedly arranged, the entire blue phase liquid crystals have characteristics of isotropy. If an electric field is applied to blue phase liquid crystal, liquid crystals arranged in the corresponding electric field direction increase and have anisotropic characteristics. Further, because a domain formed by each liquid crystal has a nano size, liquid crystals have negligible or effectively no influence on each other.

Due to characteristics of blue phase liquid crystal, exemplary embodiments of a liquid crystal display according to the present invention has the following advantageous characteristics.

An alignment layer disposed at the inside of the substrate is not required. Since blue phase liquid crystals are disorderedly arranged, but before an electric field is applied, blue phase liquid crystal has a property of isotropy, it is unnecessary to form an alignment layer.

Another characteristic of a liquid crystal display using blue phase liquid crystal, is that a cell gap of a liquid crystal layer is not critical to a display device. For example, it is necessary to form blue phase liquid crystal only in a minimal predetermined thickness or more, and even if a liquid crystal layer including the blue phase liquid crystal is relatively thickly formed, characteristics thereof do not change. Advantageously, it is unnecessary to manufacture a display device in consideration of a thickness of the liquid crystal layer.

Another advantageous characteristic of a liquid crystal display using blue phase liquid crystal, is that even when the liquid crystal display including the blue phase liquid crystal is pressed manually (e.g., by a hand), a bruising phenomenon in which a color sense of images changes, does not occur.

Because liquid crystal has isotropy in essentially all directions, it is unnecessary that the liquid crystal display uses a compensation film.

Exemplary embodiments of a structure of a liquid crystal display using the stabilized blue phase liquid crystal is described in detail with reference to the drawings.

Figure 2:
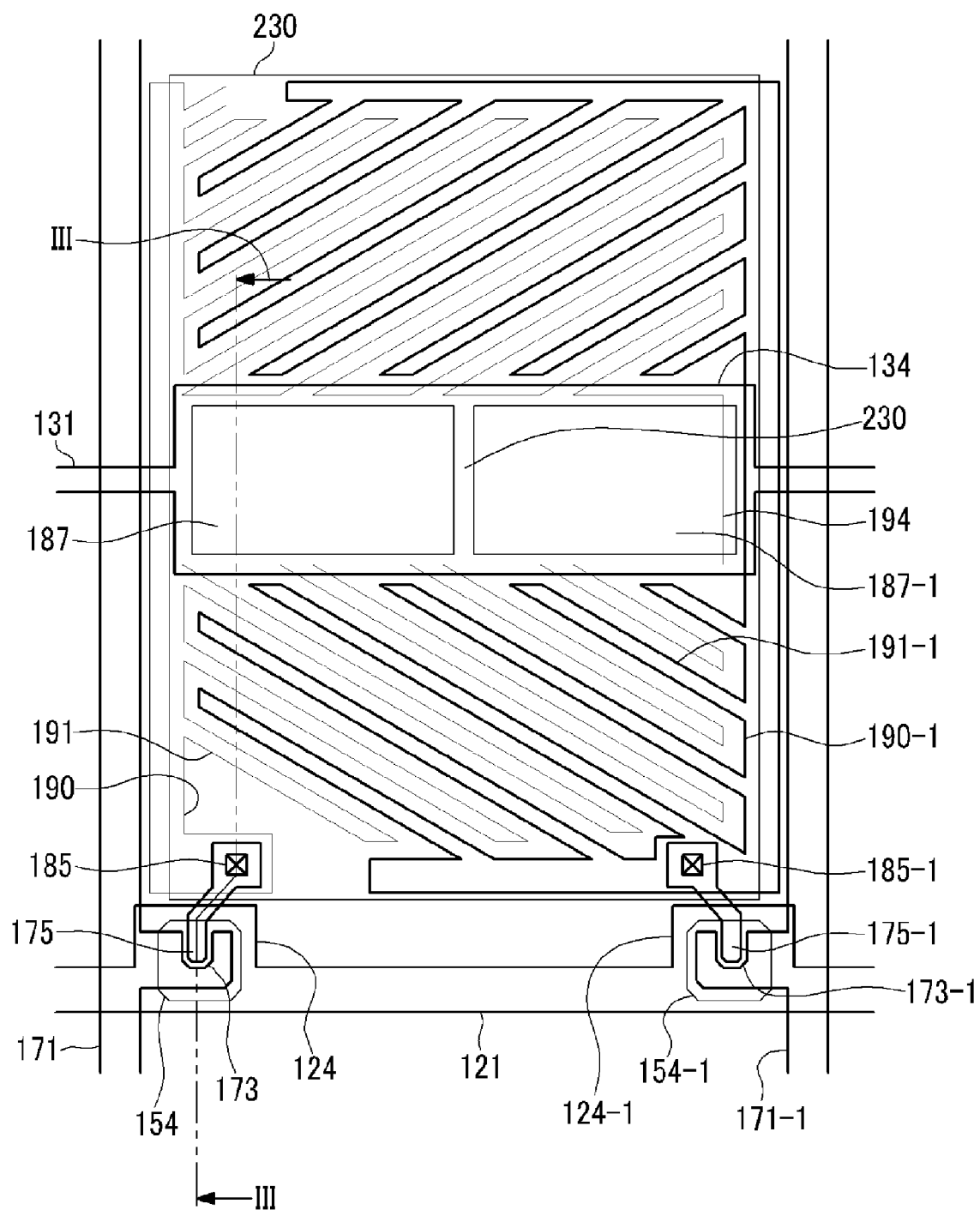
FIG. 2 is a layout view of an exemplary embodiment of a liquid crystal display, according to the present invention.
Figure 3:
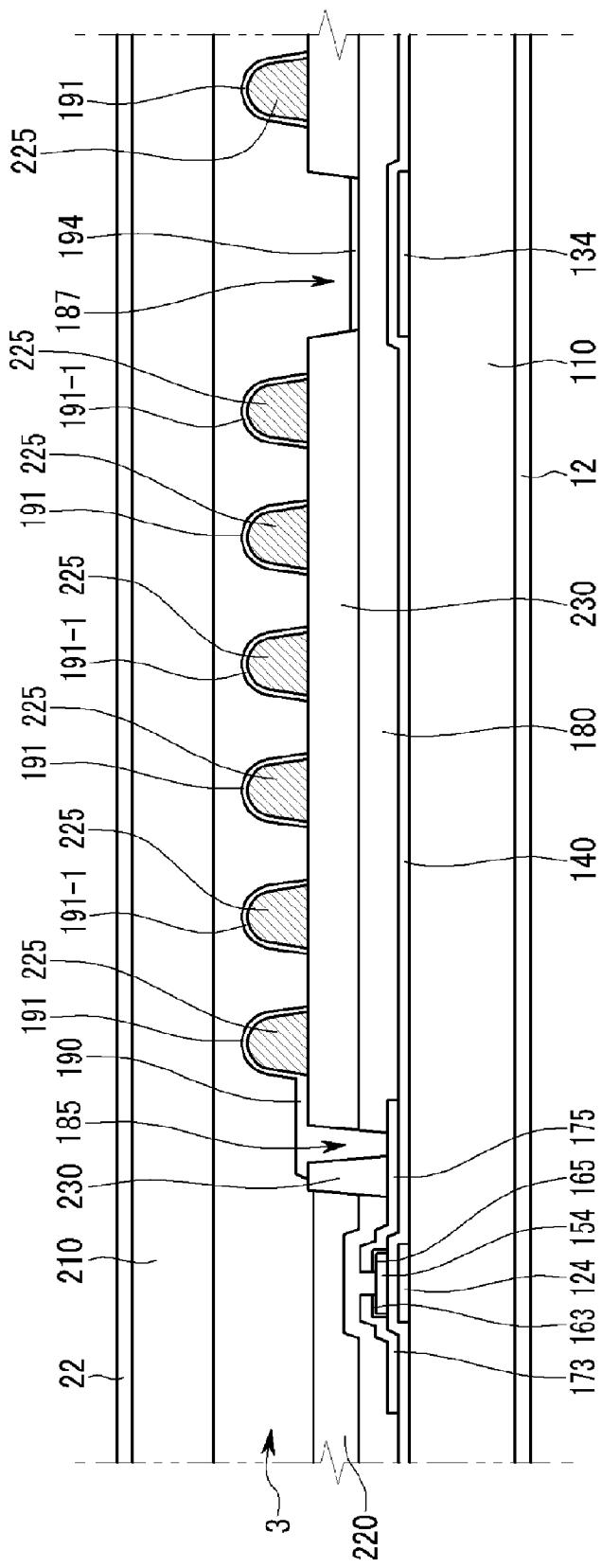
FIG. 3 is a cross-sectional view of the liquid crystal display taken along line III-III of FIG. 2.

FIG. 2 is a layout view of an exemplary embodiment of a liquid crystal display according to the present invention, and FIG. 3 is a cross-sectional view of the liquid crystal display taken along line III-III of FIG. 2.

First, a lower thin film transistor array panel is described.

Gate wires 121, 124, and 124-1 and a storage capacitance line 131 are disposed on a transparent insulation substrate 110. The transparent insulation substrate may include glass, and so on.

The gate wires 121 and 124 include a gate line 121 extending substantially in a first (horizontal) direction in the layout view. A portion of the gate line 121 protrudes upwards in a second (vertical) direction in the layout view, to form gate electrodes 124 and 124-1. As shown in FIG. 2, a plurality of the gate electrode, e.g., two gate electrodes 124 and 124-1, are disposed in each of a pixel area.

The storage capacitance line 131 is disposed substantially in parallel to the gate line 121. The storage capacitance line 131 may include a portion having a relatively wider first width within the pixel area than a second width of the storage capacitance line 131 disposed overlapping boundaries of the pixel area. The portion of the storage capacitance line 132 having the (wider) first width forms a storage electrode 134. The first and the second widths are taken in the second direction, substantially perpendicular to the first direction.

The gate wires 121, 124, and 124-1, and the storage capacitance line 131 are covered with a gate insulating layer 140. The gate insulating layer 140 may be disposed on and overlap an entire of the transparent substrate 110, and may directly contact the gate wires 121, 124, and 124-1, and the storage capacitance line 131. Semiconductor layers 154 and 154-1, which may include amorphous silicon, are disposed on portions of the gate insulating layer 140. The semiconductor layers 154 and 154-1 are overlapped with the gate electrodes 124 and 124-1, and form a channel of a thin film transistor. Ohmic contact layers 163, 165, 163-1, and 165-1, which may include amorphous silicon in which N-type impurity such as phosphorous is doped with a high concentration, are disposed on the semiconductor layers 154 and 154-1. The ohmic contact layers 163 and 165, and the ohmic contact layers 163-1 and 165-1, are separated from each other to define the channel of the thin film transistor.

Data wires 171, 173, 175, 171-1, 173-1, and 175-1 are disposed on the ohmic contact layers 163, 165, 163-1, and 165-1 and the gate insulating layer 140. The data wires 171, 173, 175, 171-1, 173-1, and 175-1 include two data lines 171 and 171-1 extending substantially in the vertical direction, source electrodes 173 and 173-1 respectively connected thereto, and drain electrodes 175 and 175-1 respectively separated therefrom. The source electrodes 173 and 173-1 and the drain electrodes 175 and 175-1 are respectively separated from each other, further defining the channel of the thin film transistor. The source electrodes 173 and 173-1 respectively protrude upwards in the vertical direction in the layout view from the data lines 171 and 171-1 in an upper part of the gate electrodes 124 and 124-1, and have substantially a "U" shape, or a horse's hoof shape. The drain electrodes 175 and 175-1 are respectively disposed opposite to the source electrodes 173 and 173-1 relative to the channel of the thin film transistor, and a first (distal) end thereof is positioned within a "U" shape, or a horse's hoof shape of the source electrodes 173 and 173-1, while a second end thereof is extended and has a relatively wide width taken in the first and/or second directions.

The ohmic contact layers 163, 165, 163-1, and 165-1 are disposed only in a region where the semiconductor layers 154 and 154-1 and the data wires 171, 173, 175, 171-1, 173-1, and 175-1 overlap. The gate electrode 124, the semiconductor layer 154, the source electrode 173, and the drain electrode 175 define a single e.g., one) first transistor, and the gate electrode 124-1, the semiconductor layer 154-1, the source electrode 173-1, and the drain electrode 175-1, which are symmetrically disposed thereto, define a single second transistor.

A passivation layer 180 is disposed on the data wires 171, 173, 175, 171-1, 173-1, and 175-1. A color filter 230 and a black matrix 220 are both disposed on the transparent substrate 110, and directly on and contacting portions of the passivation layer 180. The black matrix 220 may be disposed directly on an uppermost surface of the transistor, the gate line 121, and the data lines 171 and 171-1. The color filter 230 is disposed in a region where the black matrix 220 is not disposed (e.g., except for the black matrix 220). A portion of the color filter 230 may directly contact the drain electrode 175 and 175-1, as shown in FIG. 3.

Openings 185, 185-1, 187 and 187-1 are disposed in an upper part of the drain electrodes 175 and 175-1 and an upper part of the storage electrode 134. The openings 185 and 185-1 are disposed to extend completely through the passivation layer 180 and the color filter 230, and expose an upper surface of the drain electrodes 175 and 175-1 respectively. In contrast, the openings 187 and 187-1 are formed to extend only completely through the color filter 230, while not being formed to extend into the passivation layer 180. Referring to FIG. 2, a leftmost boundary of the opening 187, and a rightmost boundary of the opening 187-1 are disposed at a distance away from longitudinal edges extending in a longitudinal direction (e.g., second direction) of the color filter 230. The openings 187 and 187-1 are spaced away from each other in a transverse direction (e.g., first direction) within the color filter 230. A portion of the color filter 230 is disposed between the openings 187 and 187-1, at substantially a center of the color filter 230, and extends substantially in the second direction.

A plurality of a protrusion 225 is disposed directly on an upper surface of the color filter 230. In the illustrated exemplary embodiment, the protrusion 225 has a substantially bell-shaped section, but may have various cross-section shapes such as a semicircular shape, a semi-oval shape, a triangular shape, and a trapezoidal shape in alternative embodiments. It is preferable that a side surface of the protrusion 225 has a taper shape, such that a width of the protrusion 225 increases from a distal end of the protrusion 225 towards the color filter 230. The width of the protrusion 225 may be taken substantially in the first and/or second directions. In an exemplary embodiment, the protrusion 225 may include a same material as that of the black matrix 220, and may be configured to not transmit (e.g., block) light incident thereon.

A first pixel electrode 190 and a second pixel electrode 190-1 are disposed directly on the protrusions 225. The first pixel electrode 190 and the second pixel electrode 190-1 are electrically connected to the drain electrodes 175 and 175-1 through the openings 185 and 185-1, respectively. The first and second pixel electrodes 190 and 190-1 may include a transparent conductor such as ITO or IZO. The first and second pixel electrodes 190 and 190-1 may respectively include a plurality of a first linear electrode 191 and a plurality of a second linear electrode 191-1, each extending in an oblique direction relative to the gate line 121 and the data lines 171 and 171-1. Both the first linear electrode 191 and the second linear electrode 191-1 of the first pixel electrode 190 and the second pixel electrode 190-1, are disposed directly on and overlapping the protrusions 225. The first linear electrodes 191 and the second linear electrodes 191-1 may completely overlap surfaces of the protrusions 225 not facing the color filter 230. A lower surface of the first and second pixel electrodes 190 and 190-1, of the first and second linear electrodes 191 and 191-1 may directly contact an upper surface of the color filter 230.

A structure of the first pixel electrode 190 is described as follows.

The first pixel electrode 190 includes a first trunk portion disposed along the first data line 171, and a surface electrode 194. A boundary of the first trunk portion of the first pixel electrode 190 extends substantially parallel to the data line 171, and is spaced apart from the data line 171. The surface electrode 194 substantially corresponds to the storage electrode 134, and is overlaps a portion of the storage electrode 134. The first linear electrode 191 extends in an oblique direction from the first trunk portion and the surface electrode 194. Referring to FIG. 2, the first linear electrode 191 extends in a right upper direction from an upper edge of the surface electrode 194, and the first linear electrode 191 extends in a right lower direction from a lower edge of the surface electrode 194. In an exemplary embodiment, the first linear electrode 191 is disposed in an angle of about 45° relative to the gate line 121 or the data lines 171 and 171-1.

The second pixel electrode 190-1 includes an upper portion and a lower portion both substantially in parallel to the gate line 121, and a side portion disposed along the second data line 171-1, which may be considered a second trunk portion of an inverse ⊏-shaped structure. The second linear electrode 191-1 extends from the second trunk portion of an inverse ⊏-shaped structure. The second linear electrode 191-1 extends in a left lower direction relative to the upper edge of the surface electrode 194, and the second linear electrode 191-1 extends in a left upper direction relative to the lower edge of the surface electrode 194.

Each of the first linear electrodes 191 and each of the second linear electrodes 191-1 are disposed directly on a protrusion 225, and are disposed substantially in parallel to each other. Different voltages are applied to the first linear electrodes 191 and the second linear electrodes 191-1. In an exemplary embodiment, a common voltage is applied to one side thereof, and a data voltage is applied to the other side thereof. Alternatively, a data voltage may be applied to one side thereof, and a data voltage having opposite polarity may be applied to the other side thereof.

In the illustrated embodiment, a separate member of the liquid crystal display is not disposed on a transparent substrate 210 of an upper panel facing the thin film transistor panel. The black matrix 220, the color filter 230, etc., are disposed on the (lower) thin film transistor array panel.

Polarizers 12 and 22 are attached to an outermost surface of the transparent substrate 110 of the thin film transistor display panel, and an outermost surface of the transparent substrate 210 of the upper panel, respectively. In an exemplary embodiment, absorption axes of the polarizers 12 and 22 are disposed substantially perpendicular to each other, and/or may have an angle of about 45° relative to the first linear electrode 191 and the second linear electrode 191-1.

In the illustrated embodiment, an alignment layer is advantageously not disposed at the innermost surface of the thin film transistor array panel and of the upper panel. A liquid crystal 3 is disposed, such as by injection, between the upper panel and the lower panel. The liquid crystal layer 3 is blue phase liquid crystal.

An exemplary embodiment of a method of manufacturing a thin film transistor array panel in the liquid crystal display shown in FIGS. 2 and 3, is described in detail with reference to FIGS. 4 to 15.

Figure 4:
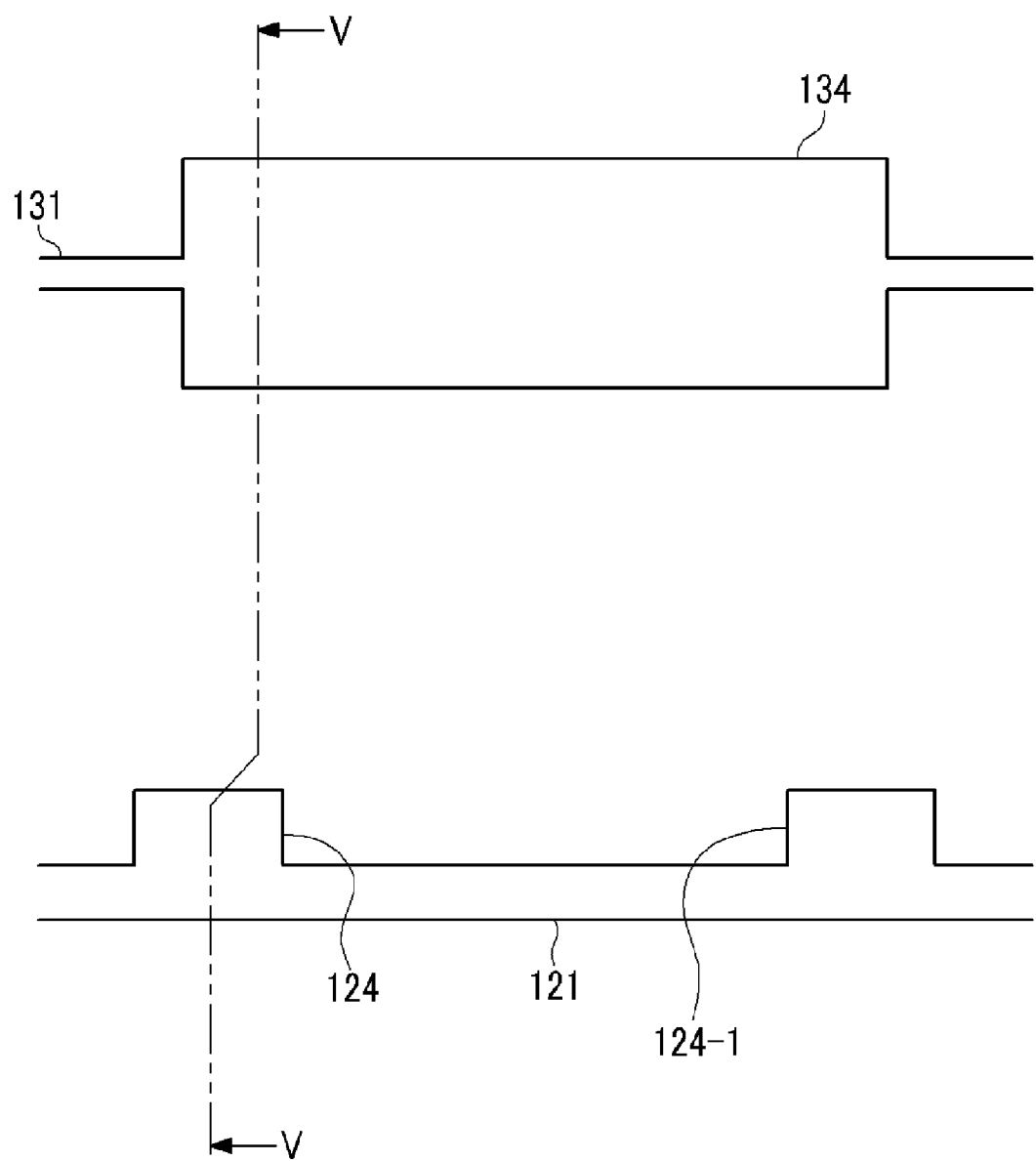
FIGS. 4, 6, 8, 10, 12, and 14 are layout views in an intermediate step of an exemplary embodiment of a method of manufacturing a thin film transistor array panel of the liquid crystal display of FIGS. 2 and 3, according to the present invention.
Figure 5:
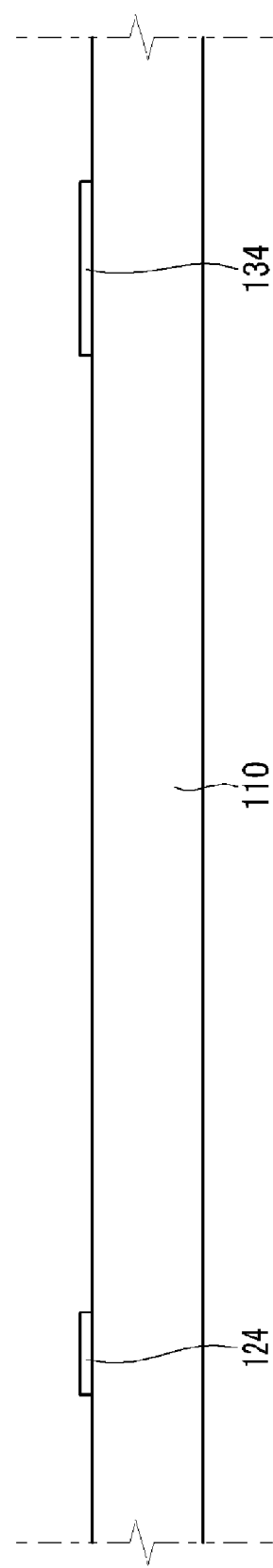
FIG. 5 is a cross-sectional view illustrating the thin film transistor array panel taken along line V-V of FIG. 4.
Figure 6:
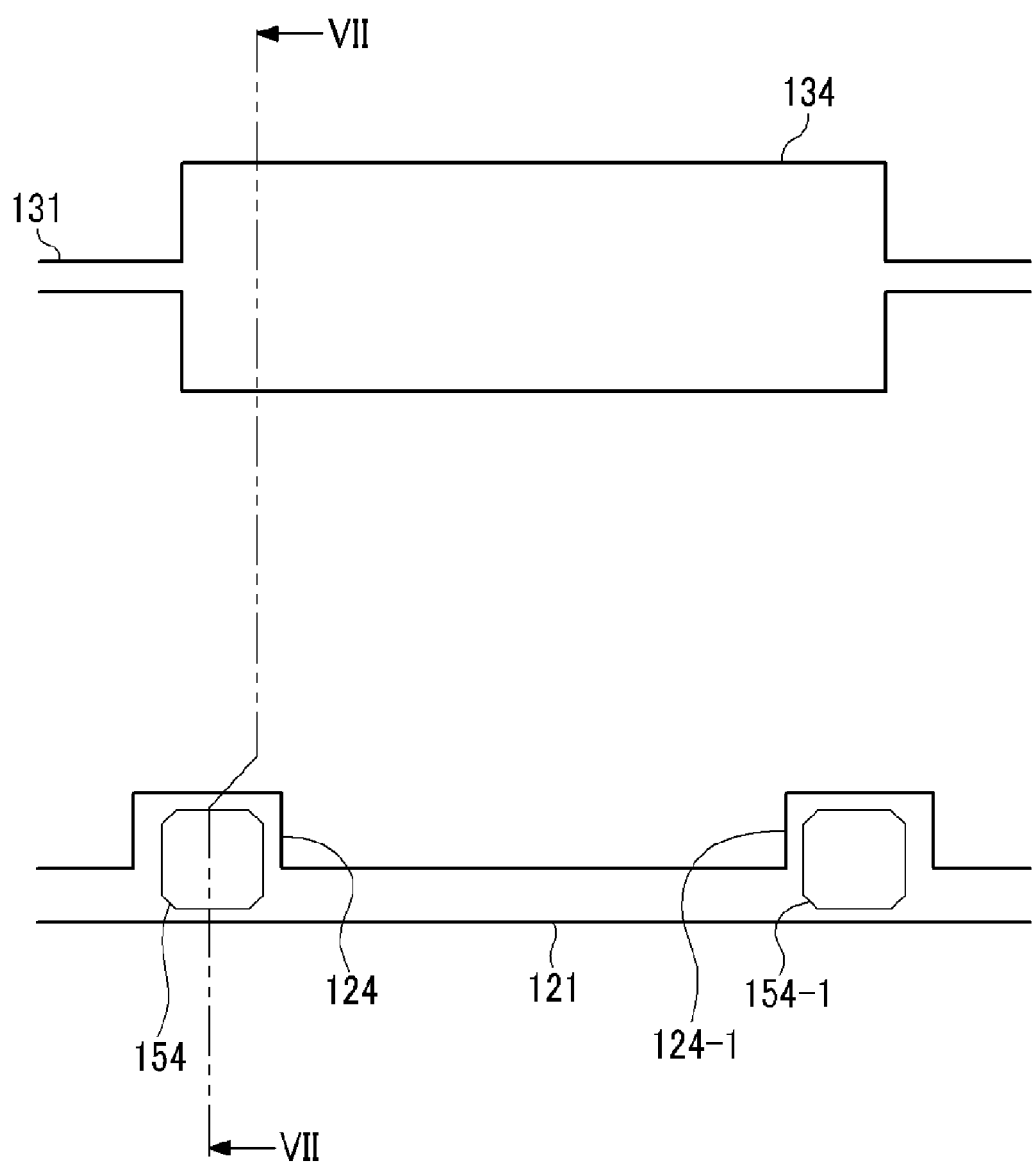
Figure 7:
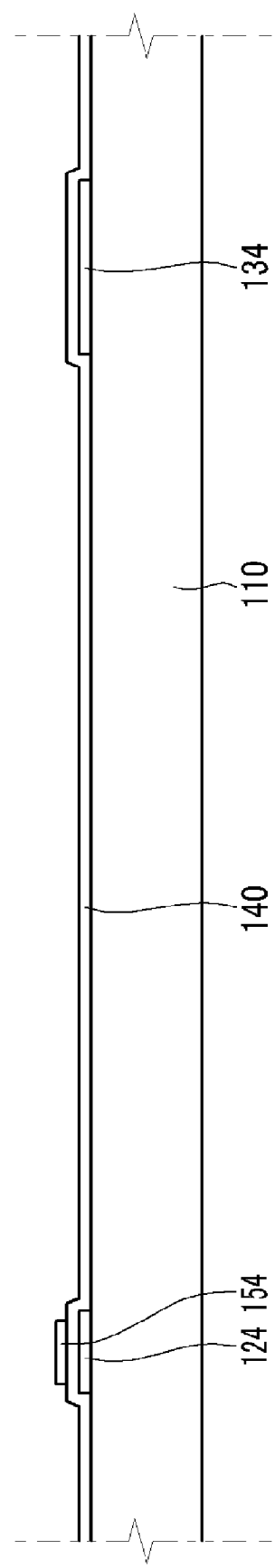
FIG. 7 is a cross-sectional view illustrating the thin film transistor array panel taken along line VII-VII of FIG. 6.
Figure 8:
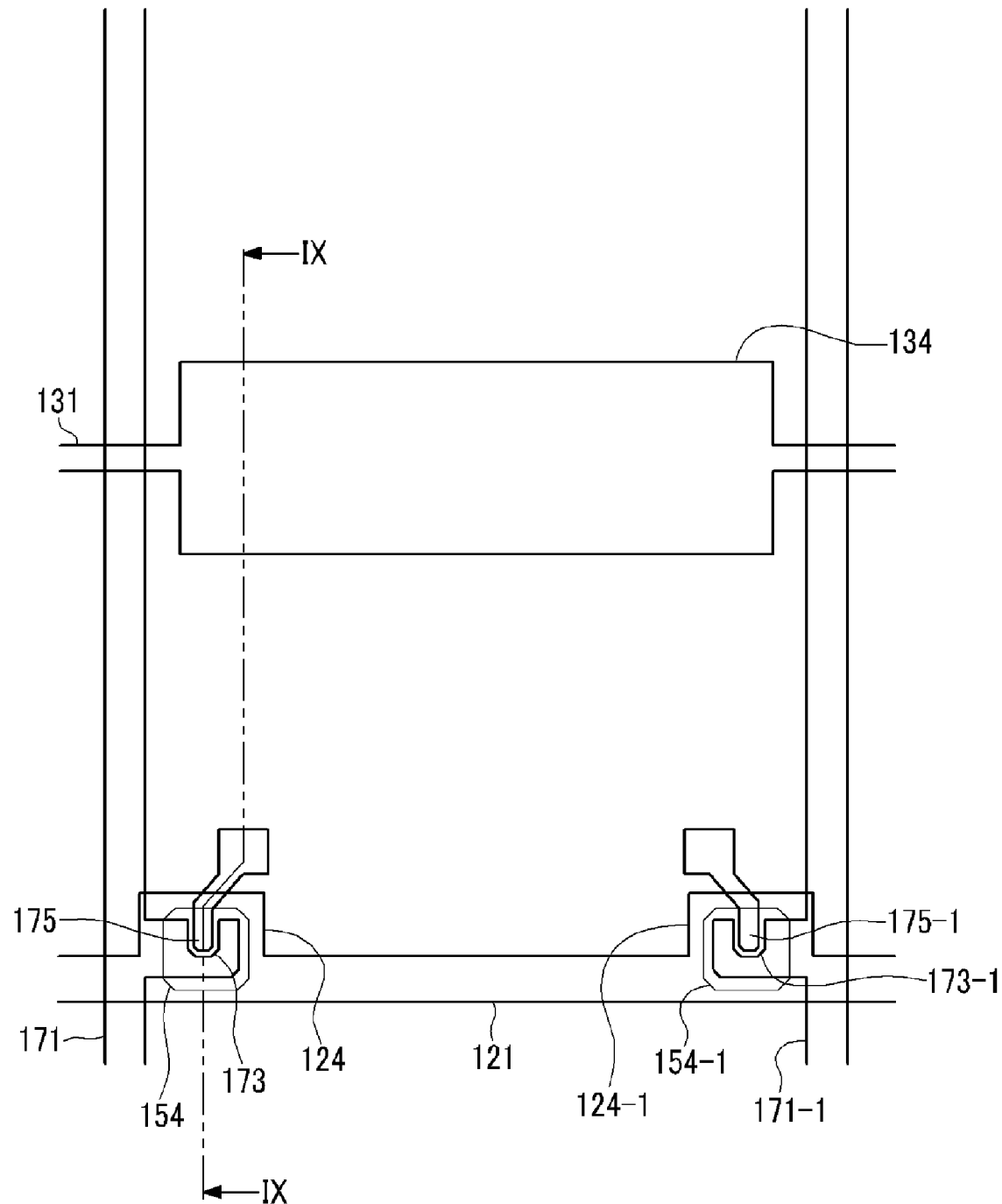
Figure 9:
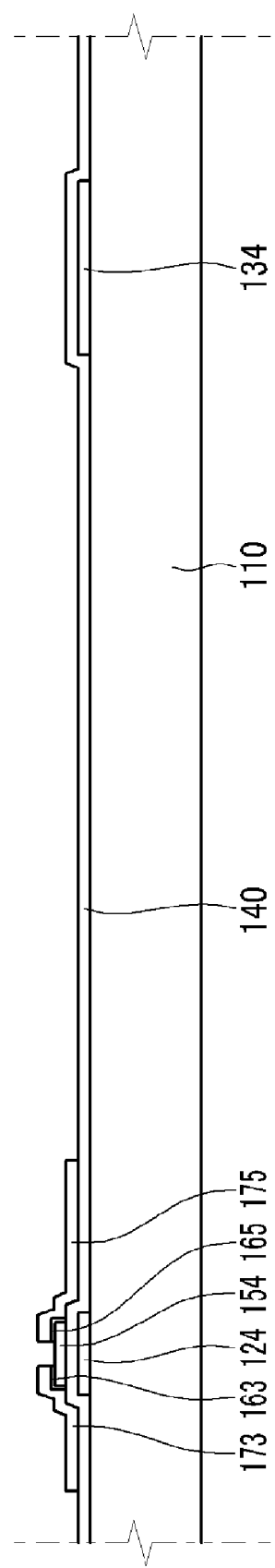
FIG. 9 is a cross-sectional view illustrating the thin film transistor array panel taken along line IX-IX of FIG. 8.
Figure 10:
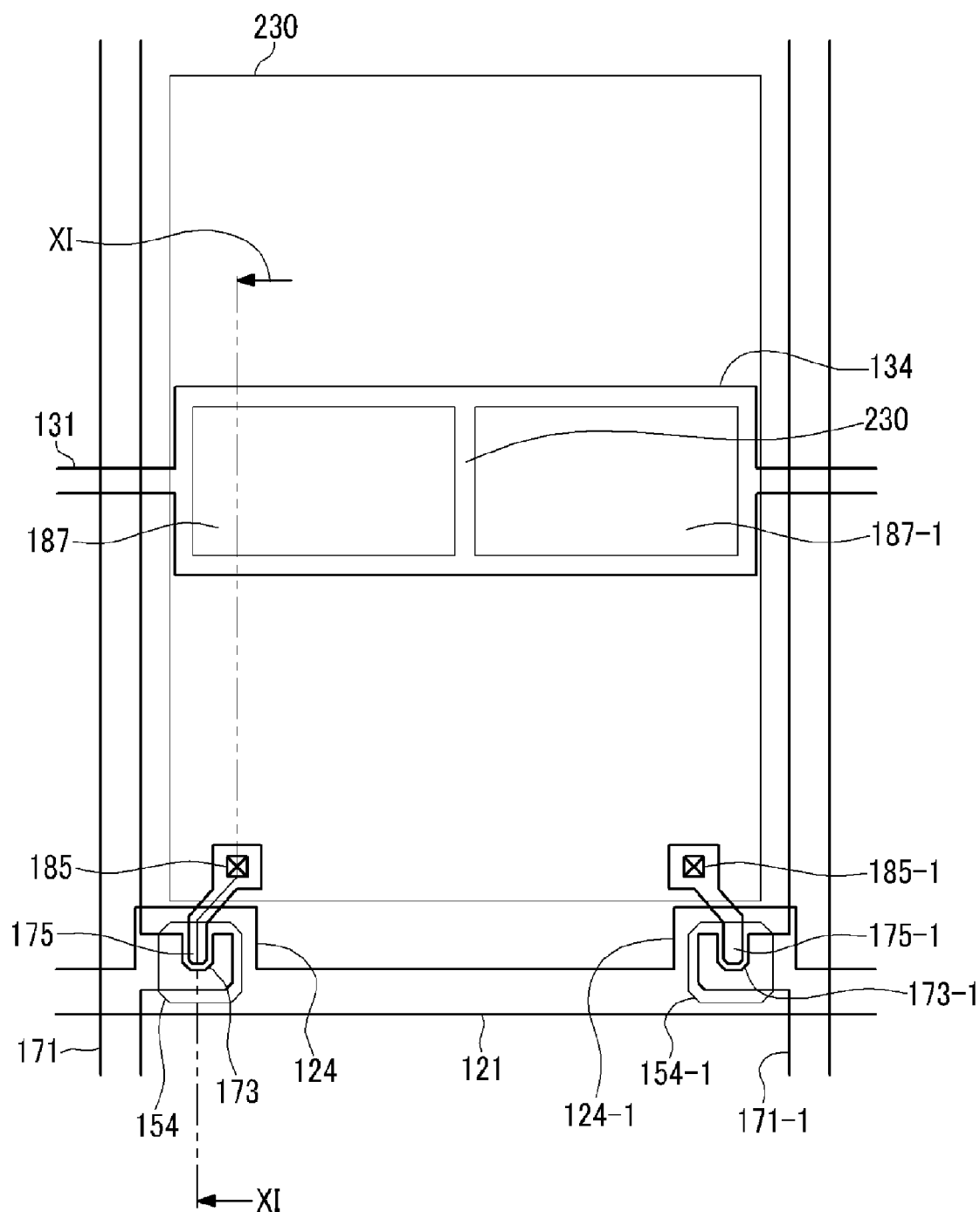
Figure 11:
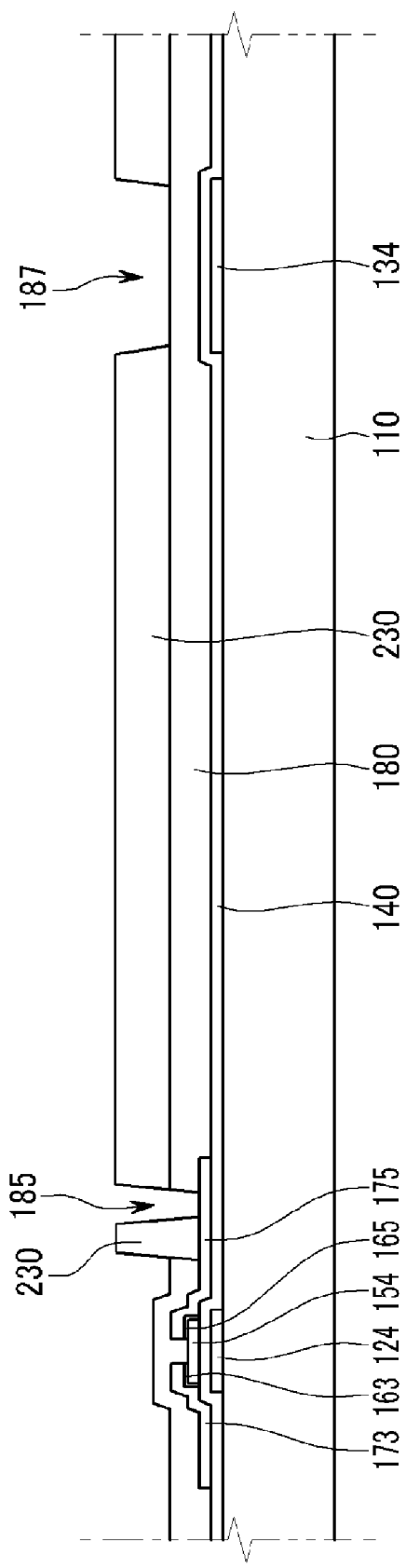
FIG. 11 is a cross-sectional view illustrating the thin film transistor array panel taken along line XI-XI of FIG. 10.
Figure 12:
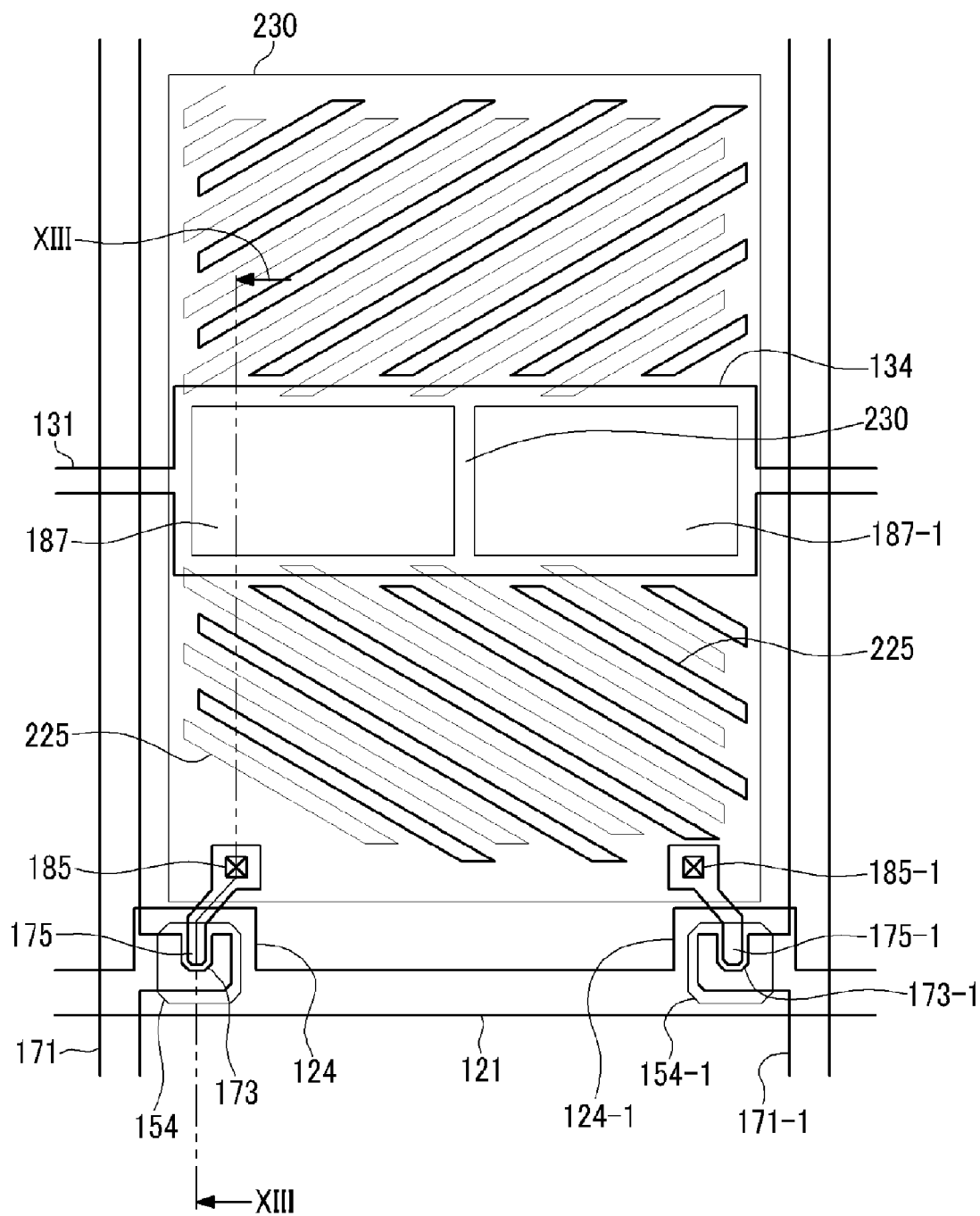
Figure 13:
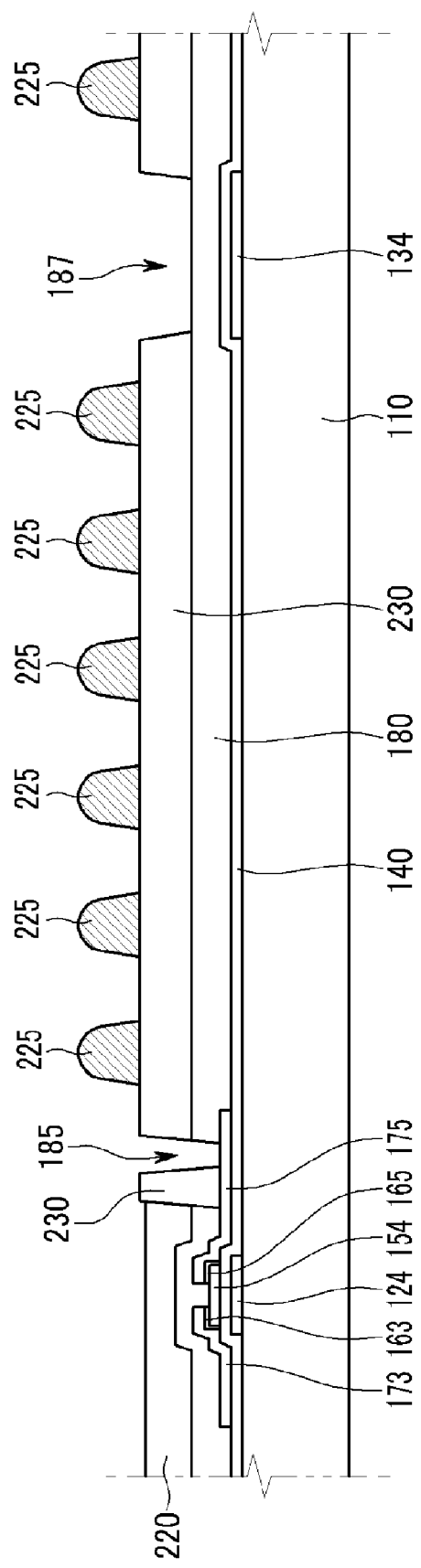
FIG. 13 is a cross-sectional view illustrating the thin film transistor array panel taken along line XIII-XIII of FIG. 12.
Figure 14:
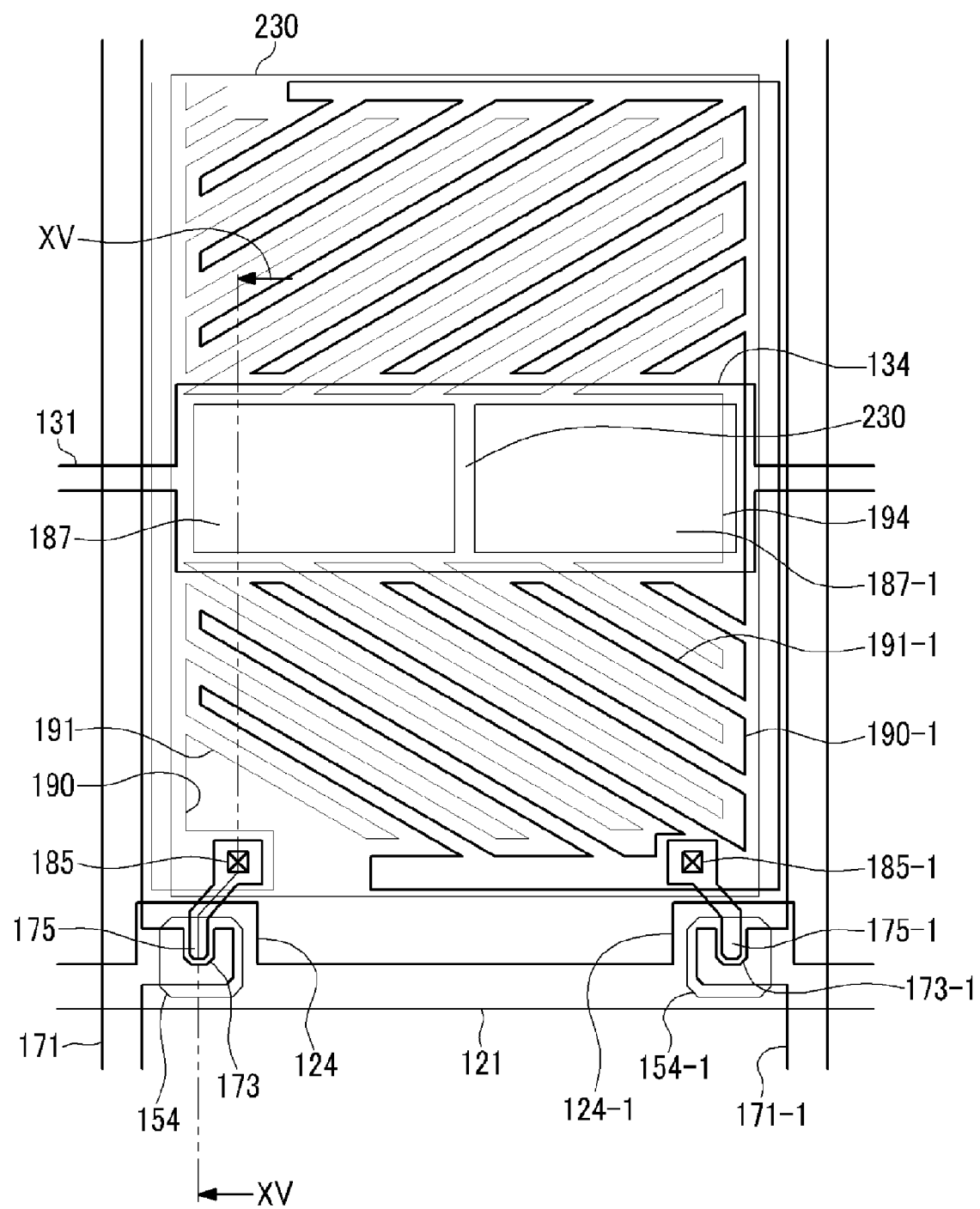
Figure 15:
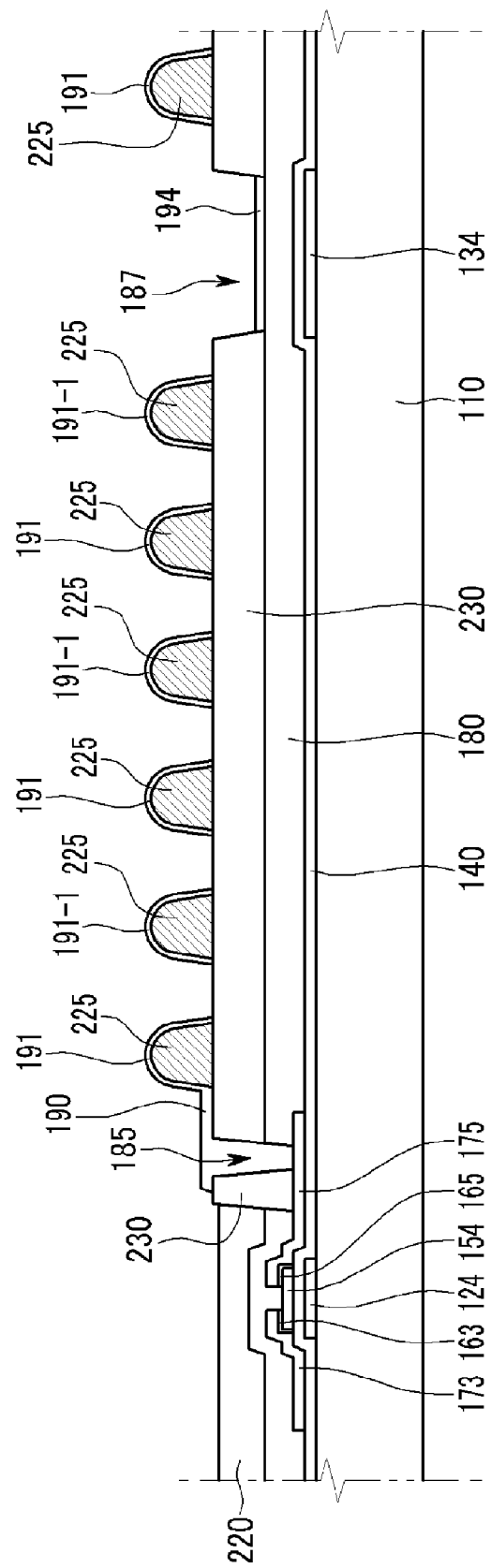
FIG. 15 is a cross-sectional view illustrating the thin film transistor array panel taken along line XV-XV of FIG. 14.

FIGS. 4, 6, 8, 10, 12, and 14 are layout views of an exemplary embodiment of an intermediate step of a method of manufacturing a thin film transistor array panel of the liquid crystal display of FIGS. 2 and 3 according to the present invention, FIG. 5 is a cross-sectional view illustrating the thin film transistor array panel taken along line V-V of FIG. 4, FIG. 7 is a cross-sectional view illustrating the thin film transistor array panel taken along line VII-VII of FIG. 6, FIG. 9 is a cross-sectional view illustrating the thin film transistor array panel taken along line IX-IX of FIG. 8, FIG. 11 is a cross-sectional view illustrating the thin film transistor array panel taken along line XI-XI of FIG. 10, FIG. 13 is a cross-sectional view illustrating the thin film transistor array panel taken along line XIII-XIII of FIG. 12, and FIG. 15 is a cross-sectional view illustrating the thin film transistor array panel taken along line XV-XV of FIG. 14.

As shown in FIGS. 4 and 5, a plurality of each of gate wires 121, 124, and 124-1, and the storage capacitance line 131 are disposed on the transparent substrate 110.

The gate line 121 includes two gate electrodes 124 and 124-1 in each pixel area, and the storage capacitance line 131 includes a storage electrode 134 having a relatively wide width within a pixel area.

As shown in FIGS. 6 and 7, by sequentially and substantially continuously stacking three-layered films of a gate insulating layer 140, an intrinsic amorphous silicon layer, and an impurity amorphous silicon layer, and by performing a photolithography process on the impurity amorphous silicon layer and the intrinsic amorphous silicon layer, semiconductor layers 154 and 154-1 are formed. In an exemplary embodiment, the impurity amorphous silicon layer is etched with the same form (e.g., profile) as that of the semiconductor layers 154 and 154-1.

As shown in FIGS. 8 and 9, data wires 171, 173, 175, 171-1, 173-1, and 175-1 are formed. The source electrodes 173 and 173-1 respectively protrude from the data lines 171 and 171-1 from an upper part of the gate electrodes 124 and 124-1, and have a substantially "U" shape, or a horse's hoof shape. Further, the drain electrodes 175 and 175-1 are disposed opposite to the source electrodes 173 and 173-1. A first (distal) end of the drain electrodes 175 and 175-1 is positioned at the inside of the "U" shape, or the horse's hoof shape, of the source electrodes 173 and 173-1. At a second end of the drain electrodes 175 and 175-1 extends to have a substantially wide width where the opening 185 and 185-1 is respectively disposed.

As shown in FIGS. 10 and 11, a passivation layer 180 disposed covering the data wires 171, 173, 175, 171-1, 173-1, and 175-1 is formed. A color filter 230 is formed on the passivation layer 180, and openings 185, 185-1, 187 and 187-1 are formed, such as by etching the color filter 230.

As shown in FIGS. 12 and 13, a black matrix 220 and a plurality of a protrusion 225 are formed. In an exemplary embodiment, it is preferable that the black matrix 220 and the protrusions 225 include the same material, and are formed by performing a photolithography process one time, e.g., substantially a same time. As a material for forming the black matrix 220, a black color organic material can be used. However when the black color organic material is used, the protrusion 225 may not be formed at a sufficient height, taken in a direction substantially perpendicular to the transparent substrate 110. In one exemplary embodiment, by adding a black color material, such as carbon black, the black matrix 220 and the protrusion 225 can be formed together, at substantially a same time.

As shown in FIGS. 14 and 15, pixel electrodes 190 and 190-1 are formed, such as including a transparent conductor. The first pixel electrode 190 includes a trunk portion, a surface electrode 194, and a first linear electrode 191, and the second pixel electrode 190-1 includes an inverse ⊏-shaped trunk portion and a second linear electrode 191-1. The first linear electrode 191 and the second linear electrode 191-1 are formed directly on and overlapping the protrusions 225, and are formed substantially in parallel to each other, respectively. In the illustrated embodiment, the first linear electrode 191 and the second linear electrode 191-1 may be disposed obliquely at an angle of about 45° relative to the gate line 121 and the data lines 171 and 171-1. In an alternative embodiment, the linear electrodes 191 and 191-1 may be patterned through exposure of a rear surface of the lower panel using the protrusions 225 as a mask.

A liquid crystal display having the above described structure and using blue phase liquid crystal, has an electrode structure of a protrusion form. Even if a relatively lower voltage is applied, liquid crystals of a relatively large region can be influenced by the lower voltage, and the liquid crystal display can be advantageously driven using the relatively low voltage. Further, if a voltage applied to the first data line 171 and a voltage applied to the second data line 171-1 have an opposite phase, the liquid crystal display can be driven even in a lower voltage.

Additionally, since the first linear electrode 191 and the second linear electrode 191-1 are formed on a protrusion including a material of a black matrix, leakage of light from a periphery of the protrusion is reduced or effectively prevented. Advantageously, picture quality is improved.

A liquid crystal display according to another exemplary embodiment of the present invention is shown in FIGS. 16 to 19 is described hereinafter.

FIGS. 16 to 19 show only cross-sectional views, and a layout view thereof is the same as that of the illustrated embodiment of FIG. 2, and thus further description of the layout view is omitted. Unlike an exemplary embodiment of FIGS. 2 to 15, in FIGS. 16 to 19, pixel electrodes 190 and 190-1 are made of an opaque conductive material, and a protrusion 240 under the pixel electrodes 190 and 190-1 is made of a transparent organic material.

Figure 16:
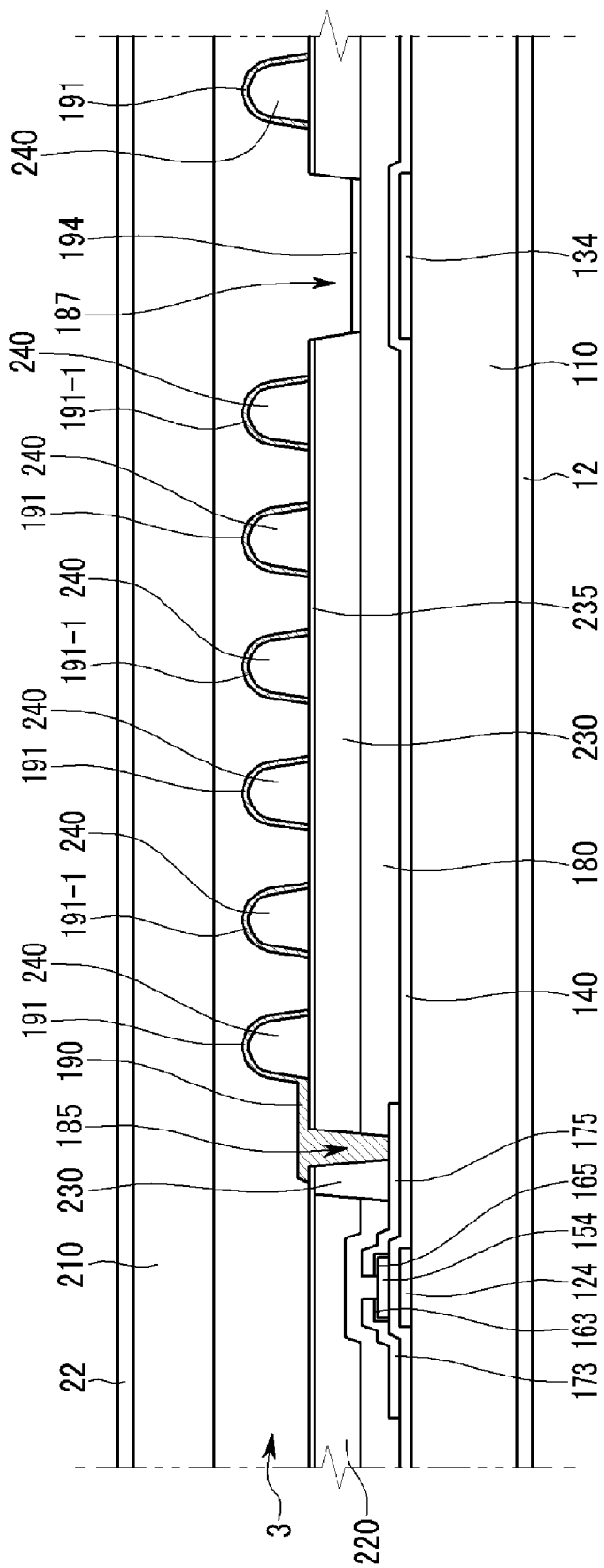
FIG. 16 is a cross-sectional view of another exemplary embodiment of the liquid crystal display taken along line III-III of FIG. 2, according to the present invention.
Figure 17:
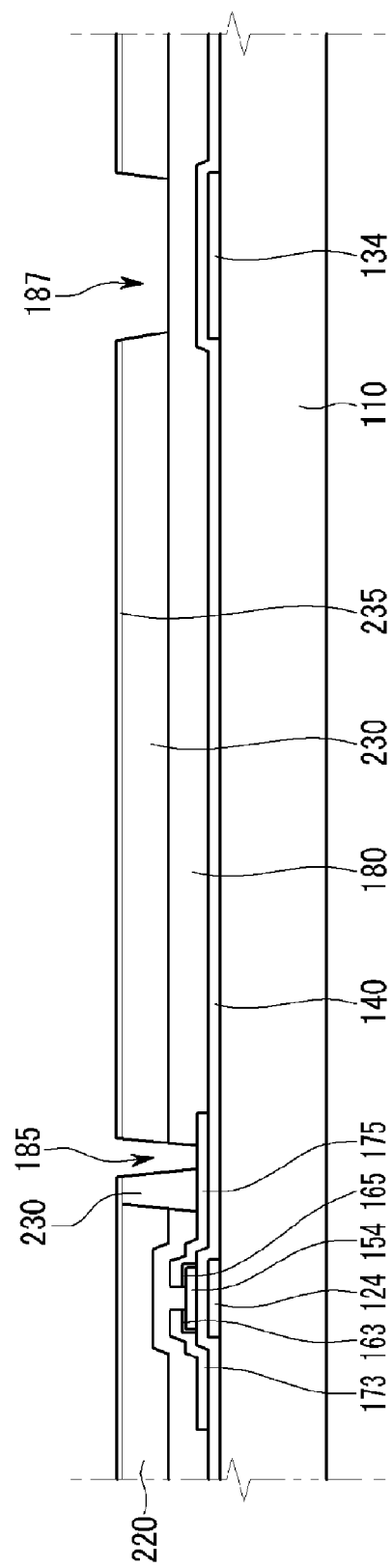
FIGS. 17 to 19 are cross-sectional views illustrating an exemplary embodiment of a process of manufacturing a thin film transistor array panel.
Figure 18:
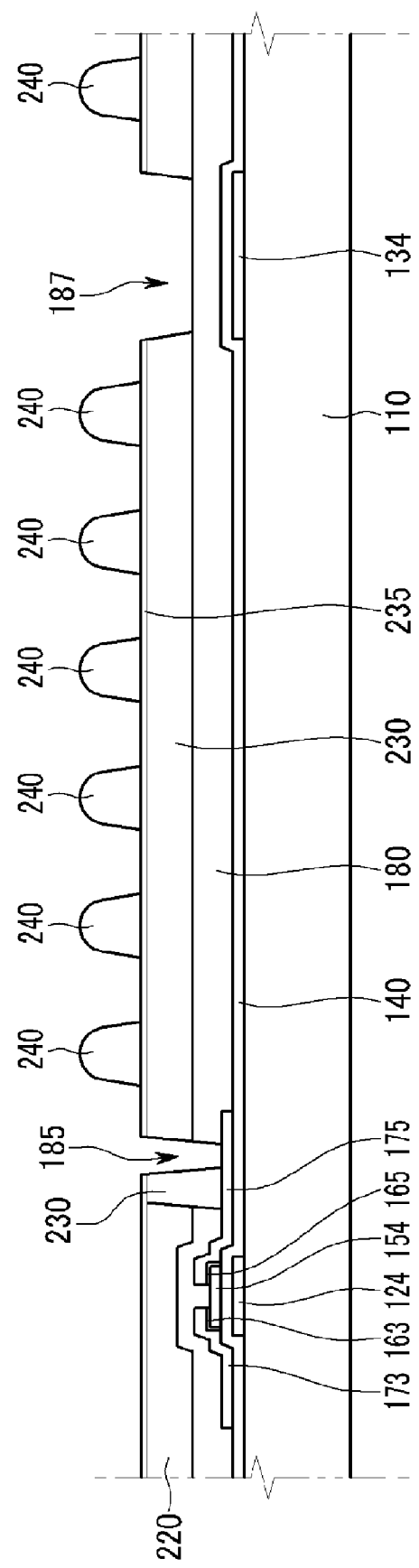
Figure 19:
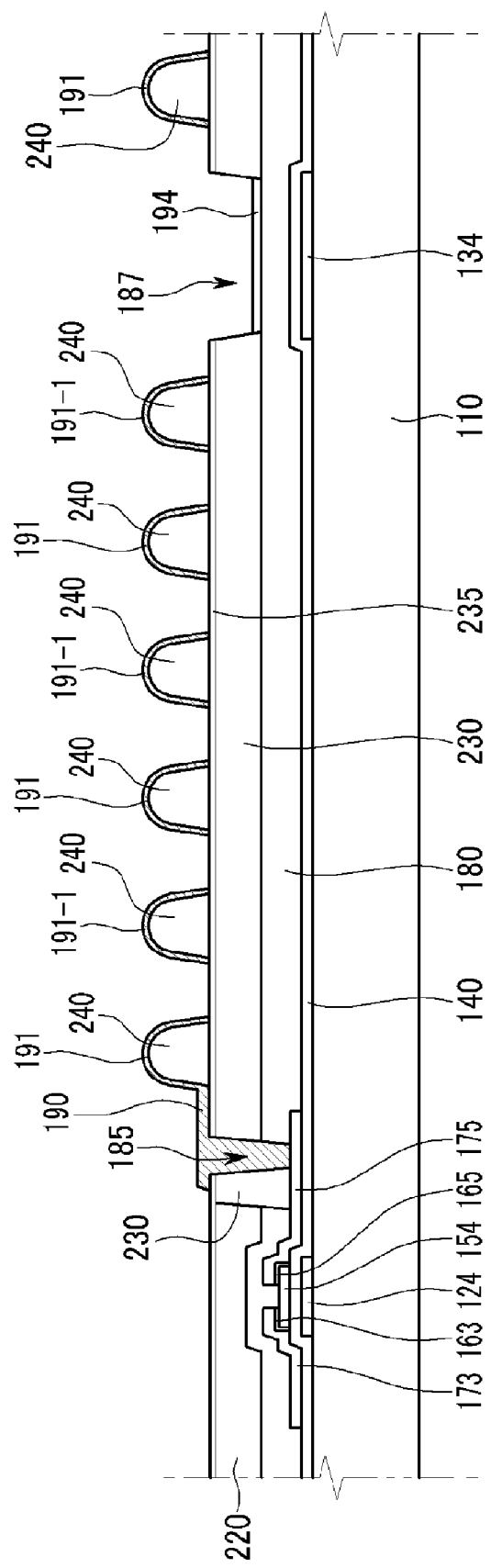

FIG. 16 is a cross-sectional view of another exemplary embodiment of the liquid crystal display taken along line III-III of FIG. 2 according to the present invention, and FIGS. 17 to 19 are cross-sectional views according to another exemplary embodiment of a process of manufacturing a thin film transistor array panel.

First, referring to FIGS. 2 and 16, a thin film transistor array panel is described.

Gate wires 121, 124, and 124-1 and a storage capacitance line 131 are disposed on a transparent insulation substrate 110 which may include glass, and so on.

The gate wires 121 and 124 include a gate line 121 extending in a first (horizontal) direction, and a portion of the gate line 121 protrudes upwards in a second (vertical) direction in the layout view to form gate electrodes 124 and 124-1. As shown in FIG. 2, two gate electrodes 124 and 124-1 are disposed in each pixel area.

The storage capacitance line 131 is disposed substantially in parallel to the gate line 121, and includes a portion having a relatively wide width within a pixel area, thereby forming a storage electrode 134.

The gate wires 121, 124, and 124-1 and the storage capacitance line 131 are covered with the gate insulating layer 140. Semiconductor layers 154 and 154-1, which may include amorphous silicon, are disposed on the gate insulating layer 140. The semiconductor layers 154 and 154-1 are overlapped with the gate electrodes 124 and 124-1, and form a channel of a thin film transistor. Ohmic contact layers 163, 165, 163-1, and 165-1, which may include amorphous silicon in which N-type impurities such as phosphorous are doped with a high concentration, are disposed on the semiconductor layers 154 and 154-1.

Data wires 171, 173, 175, 171-1, 173-1, and 175-1 are disposed on the ohmic contact layers 163, 165, 163-1, and 165-1 and the gate insulating layer 140. The data wires 171, 173, 175, 171-1, 173-1, and 175-1 include two data lines 171 and 171-1 extending substantially in the vertical direction, source electrodes 173 and 173-1 respectively connected thereto, and drain electrodes 175 and 175-1 separated therefrom. The source electrodes 173 and 173-1 protrude upwards in the vertical direction in the layout view from the data lines 171 and 171-1 in an upper part of the gate electrodes 124 and 124-1 and have substantially a "U" shape, or a horse's hoof shape. The drain electrodes 175 and 175-1 are respectively disposed opposite to the source electrodes 173 and 173-1 relative to the channel of the thin film transistor, and a first (distal) end thereof is positioned within a "U" shape, or a horse's hoof shape of the source electrodes 173 and 173-1, while a second end thereof is extended and has a relatively wide width.

The ohmic contact layers 163, 165, 163-1, and 165-1 are disposed only in a region where the semiconductor layers 154 and 154-1 and the data wires 171, 173, 175, 171-1, 173-1, and 175-1 overlap. The gate electrode 124, the semiconductor layer 154, the source electrode 173, and the drain electrode 175 form one (single) first transistor, and the gate electrode 124-1, the semiconductor layer 154-1, the source electrode 173-1, and the drain electrode 175-1 symmetrically disposed thereto form one (single) second transistor.

A passivation layer 180 is disposed on the data wires 171, 173, 175, 171-1, 173-1, and 175-1. A color filter 230 and a black matrix 220 are both disposed on the passivation layer 180. A capping layer 235, which may include a silicone nitride film SiNx and so on, is disposed directly on an upper surface of the color filter 230 and the black matrix 220. The capping layer 235 performs a function of protecting the black matrix 220 and the color filter 230. The black matrix 220 is disposed on an uppermost surface of a transistor, the gate line 121, and the data lines 171 and 171-1. The color filter 230 is disposed in a region where the black matrix 220 is not disposed (e.g., except for the black matrix 220).

Completely through the color filter 230 and the capping layer 235, openings 185, 185-1, and 187 are formed to expose an upper portion of the drain electrodes 175 and 175-1 and an upper portion of the storage electrode 134. The openings 185 and 185-1 are formed to extend completely through the passivation layer 180, the color filter 230, and the capping layer 235, and expose the drain electrodes 175 and 175-1. In contrast, the opening 187 formed exposing the storage electrode 134 is formed to extend only through the color filter 230 and the capping layer 235, and does not extend into the passivation layer 180.

A plurality of the protrusion 240 is disposed directly on the capping layer 235, such that a portion of the capping layer 235 is disposed between a lower surface of the protrusions 240 and the color filter 230. In the illustrated embodiment, the protrusion 240 has substantially a bell-shaped section, but may have various cross-section shapes such as a semicircular shape, a semi-oval shape, a triangular shape, and a trapezoidal shape in alternative embodiments. It is preferable that a side surface of the protrusion 240 has a taper shape. In the illustrated embodiment, the protrusion 240 is formed with an organic film, and the organic film transmits light. This is different from the embodiment of FIGS. 2 to 15 where the protrusions 225 include the same material as that of the black matrix 220.

A first pixel electrode 190 and a second pixel electrode 190-1 are disposed directly on the protrusion 240. The first pixel electrode 190 and the second pixel electrode 190-1 are electrically connected to the drain electrodes 175 and 175-1 through the openings 185 and 185-1, respectively. The pixel electrodes 190 and 190-1 may include an opaque conductive material, and include a first linear electrode 191 and a second linear electrode 191-1 extending in an oblique direction relative to the gate line 121 and the data lines 171 and 171-1. Further, both the first linear electrode 191 and the second linear electrode 191-1 in the first pixel electrode 190 and the second pixel electrode 190-1 are disposed directly on and overlapping substantially all surfaces of the protrusion 240, except for the lower surface facing the capping layer 235. The illustrated embodiment is different from the embodiment of FIGS. 2 to 15, in that the pixel electrodes in FIGS. 16-19 include an opaque conductive material.

A structure of the first pixel electrode 190 is described as follows.

The first pixel electrode 190 includes a first trunk portion disposed extended along the first data line 171, and a surface electrode 194 corresponding to the storage electrode 134 and overlapped thereto positioned at an upper part of the storage electrode 134. The first linear electrode 191 extends in an oblique direction from the first trunk portion and edges of the surface electrode 194. The first linear electrode 191 extends in a right upper direction from an upper edge of the surface electrode 194, and the first linear electrode 191 extends in a right lower direction from a lower edge of the surface electrode 194. In an exemplary embodiment, the first linear electrode 191 is formed in an angle of about 45° relative to the gate line 121 or the data lines 171 and 171-1.

The second pixel electrode 190-1 includes an upper portion and a lower portion, both substantially in parallel to the gate line 121 and a side portion disposed along the second data line 171-1, which may be considered as a second trunk portion of an inverse ⊏-shaped structure. The second linear electrode 191-1 extends from the second trunk portion of an inverse ⊏-shaped structure. The second linear electrode 191-1 extends in a left lower direction relative to the upper edge of the surface electrode 194, and the second linear electrode 191-1 extends in a left upper direction relative to the lower edge of the surface electrode 194.

The plurality of the first linear electrode 191 and the plurality of the second linear electrode 191-1, are disposed on the protrusion 240 and are formed substantially in parallel to each other, respectively. Different voltages are applied to the first linear electrode 191 and the second linear electrode 191-1. In an exemplary embodiment, a common voltage is applied to one side thereof, and a data voltage is applied to the other side thereof. Alternatively, a data voltage may be applied to one side thereof, and a data voltage having opposite polarity may be applied to the other side thereof.

In the illustrated embodiment, a separate part of the liquid crystal display is not disposed on a transparent substrate 210 of an upper panel facing the thin film transistor panel. The black matrix 220, the color filter 230, etc., are disposed on the lower thin film transistor array panel.

Polarizers 12 and 22 are attached to an outermost surface of the transparent substrate 110 of the thin film transistor display panel and an outermost surface of the transparent substrate 210 of the upper panel, respectively. In an exemplary embodiment. absorption axes of the polarizers 12 and 22 are disposed substantially perpendicular to each other and/or may be disposed in an angle of about 45° relative to the first linear electrode 191 and the second linear electrode 191-1.

In the illustrated embodiment, an alignment layer is advantageously not disposed at the innermost side of the thin film transistor array panel and at the innermost side of the upper panel, while a liquid crystal 3 is injected therebetween is blue phase liquid crystal.

An exemplary embodiment of a method of manufacturing a thin film transistor array panel in the liquid crystal display shown in FIG. 16, is described in detail with reference to FIGS. 17 to 19.

In FIGS. 17 to 19, the same portions as those of the exemplary embodiment of FIGS. 2 to 15 are omitted, and only portions different therefrom are shown. Formation of the thin film transistor array panel up to forming the passivation layer 180 is the same as that of an exemplary embodiment of FIGS. 2 to 15 and further description thus is omitted.

As shown in FIG. 17, a passivation layer 180 disposed covering the data wires 171, 173, 175, 171-1, 173-1, and 175-1 is formed, and a black matrix 220 and a color filter 230 are formed on the passivation layer 180. A capping layer 235 is formed directly on and contacting portions of the black matrix 220 and the color filter 230. The capping layer 235 performs a function of protecting the black matrix 220 and the color filter 230. The capping layer 235, the color filter 230, and the passivation layer 180, openings 185, 185-1, and 187, respectively, are formed such as by etching.

As shown in FIG. 18, a plurality of a protrusion 240 is formed on the capping layer 235, unlike the illustrated embodiment of FIGS. 2-15 where the protrusions 225 are formed at substantially as same time as the black matrix 220. The protrusion 240 may include an organic material and can transmit light.

As shown in FIG. 19, the pixel electrodes 190 and 190-1 include an opaque conductive material. The first pixel electrode 190 includes a first trunk portion, a surface electrode 194, and a first linear electrode 191, and the second pixel electrode 190-1 includes an inverse ⊏-shaped second trunk portion and a second linear electrode 191-1. The first linear electrode 191 and the second linear electrode 191-1 are formed directly on and contacting the protrusions 240, and are formed in parallel to each other. In an exemplary embodiment, the first linear electrode 191 and the second linear electrode 191-1 may be obliquely formed in an angle of about 45° relative to the gate line 121 and the data lines 171 and 171-1.

A liquid crystal display having the above described structure of FIGS. 16-19 and using blue phase liquid crystal, has an electrode structure of a protrusion form. Even if a relatively lower voltage is applied to the liquid crystal display for driving the liquid crystal display, liquid crystals of a relatively large region may be influenced by the lower voltage, and the liquid crystal display can be advantageously driven using the relatively low voltage. Further, if a voltage applied to the first data line 171 and a voltage applied to the second data line 171-1 have an opposite phase, the liquid crystal display can be driven even in a lower voltage.

Additionally, since the first linear electrode 191 and the second linear electrode 191-1 include an opaque conductive material and cover the protrusion 240, leakage of light from a periphery of the protrusion 240 is reduced or effectively prevented. Advantageously, picture quality is improved.

In short, the illustrated exemplary embodiment of FIGS. 16 to 19 is different from the embodiment of FIGS. 2 to 15 in that the protrusion 240 is made of an organic material and a pixel electrode 190 and 190-1 formed on the protrusion 240 is formed with an opaque conductor.

A liquid crystal display according to another exemplary embodiment shown in FIGS. 20 to 24 is described hereinafter.

FIGS. 20 to 24 show only cross-sectional views, and a layout view thereof is the same as that of the illustrated embodiment of FIG. 2 and thus further description of the layout view is omitted. Unlike an exemplary embodiment of FIGS. 2 to 15, in FIGS. 20 to 24, the protrusion 240 is made of a transparent organic material, and an opaque metal layer 237 is formed under the protrusion 240.

Figure 20:
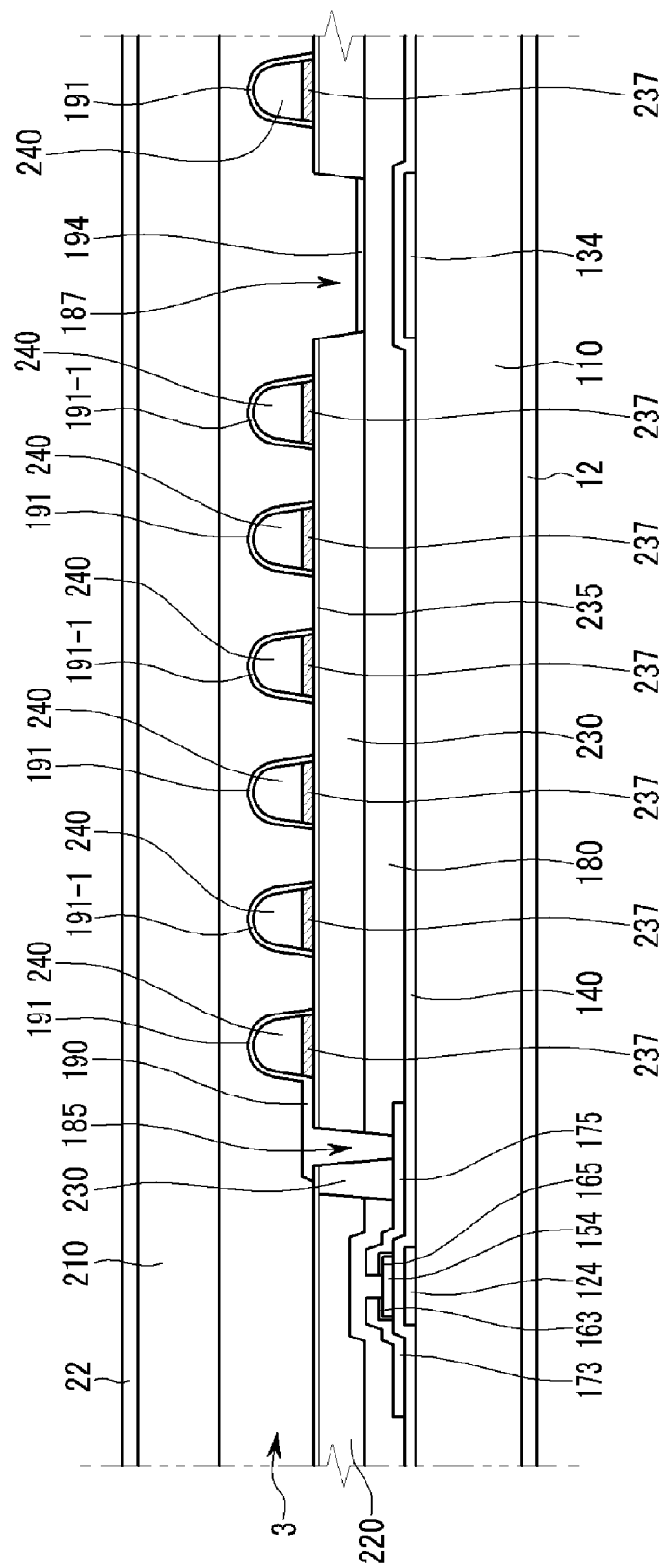
FIG. 20 is a cross-sectional view of another exemplary embodiment of the liquid crystal display taken along line III-III of FIG. 2, according to the present invention.

FIG. 20 is a cross-sectional view of another exemplary embodiment of the liquid crystal display taken along line III-III of FIG. 2 according to the present invention, and FIGS. 21 to 24 are cross-sectional views according to another exemplary embodiment of a process of manufacturing a thin film transistor array panel.

First, referring to FIGS. 2 and 20, a thin film transistor array panel is described.

Gate wires 121, 124, and 124-1 and a storage capacitance line 131 are disposed on a transparent insulation substrate 110, which may include glass, and so on.

The gate wires 121 and 124 include a gate line 121 extending in a first horizontal direction, and a portion of the gate line 121 protrudes upwards in a second (vertical) direction in the layout view to form gate electrodes 124 and 124-1. As shown in FIG. 2, two gate electrodes 124 and 124-1 are disposed in each pixel area.

The storage capacitance line 131 is disposed substantially in parallel to the gate line 121, and includes a portion having a relative wide width within a pixel area, thereby forming a storage electrode 134.

The gate wires 121, 124, and 124-1 and the storage capacitance line 131 are covered with a gate insulating layer 140. Semiconductor layers 154 and 154-1, which may include amorphous silicon, are disposed on the gate insulating layer 140. The semiconductor layers 154 and 154-1 are overlapped with the gate electrodes 124 and 124-1 to form a channel of a thin film transistor. Ohmic contact layers 163, 165, 163-1, and 165-1, which may include amorphous silicon in which N-type impurities such as phosphorous are doped with a high concentration, are disposed on the semiconductor layers 154 and 154-1.

Data wires 171, 173, 175, 171-1, 173-1, and 175-1 are disposed on the ohmic contact layers 163, 165, 163-1, and 165-1 and the gate insulating layer 140. The data wires 171, 173, 175, 171-1, 173-1, and 175-1 include two data lines 171 and 171-1 extending substantially in the vertical direction, source electrodes 173 and 173-1, respectively connected thereto, and drain electrodes 175 and 175-1 separated therefrom. The source electrodes 173 and 173-1 protrude upwards in the vertical direction in the layout view from the data lines 171 and 171-1 in an upper part of the gate electrodes 124 and 124-1 and, have a substantially "U" shape or a horse's hoof shape. The drain electrodes 175 and 175-1 are respectively disposed opposite to the source electrodes 173 and 173-1 relative to the channel of the thin film transistor, and a first (distal) end thereof is positioned within a "U" shape, or a horse's hoof shape of the source electrodes 173 and 173-1, while a second end thereof is extended and has a relatively wide width.

The ohmic contact layers 163, 165, 163-1, and 165-1 are disposed only in a region where the semiconductor layers 154 and 154-1 and the data wires 171, 173, 175, 171-1, 173-1, and 175-1 overlap. The gate electrode 124, the semiconductor layer 154, the source electrode 173, and the drain electrode 175 form one single first transistor, and the gate electrode 124-1, the semiconductor layer 154-1, the source electrode 173-1, and the drain electrode 175-1 symmetrically disposed thereto form one single second transistor.

A passivation layer 180 is disposed on the data wires 171, 173, 175, 171-1, 173-1, and 175-1. A color filter 230 and a black matrix 220 are both disposed on the passivation layer 180, and a capping layer 235 which may include a silicone nitride film SiNx and so on, is disposed on portions of the color filter 230 and the black matrix 220. The black matrix 220 is formed in an upper part of a transistor, the gate line 121, and the data lines 171 and 171-1. The color filter 230 is disposed in a region where the black matrix 220 is not disposed.

Completely through the color filter 230 and the capping layer 235, openings 185, 185-1, and 187 are formed to expose an upper portion of the drain electrodes 175 and 175-1 and an upper portion of the storage electrode 134. The openings 185 and 185-1 are formed to extend completely through the passivation layer 180, the color filter 230, and the capping layer 235 and expose the drain electrodes 175 and 175-1. In contrast, the opening 187 is formed to extend only through the color filter 230 and the capping layer 235, and does not extend into the passivation layer 180.

An opaque metal layer 237 and a plurality of a protrusion 240 are disposed on the capping layer 235. The opaque metal layer 237 is disposed only in a lower part of the protrusion 240, is formed using an opaque metal, and directly contacts the capping layer 235. In the illustrated embodiment, the protrusion 240 has substantially a bell-shaped section, but may have various cross-section shapes such as a semicircular shape, a semi-oval shape, a triangular shape, and a trapezoidal shape in alternative embodiments. It is preferable that a side surface of the protrusion 240 has a taper shape. In the present exemplary embodiment, the protrusion 240 is formed with an organic film, and the organic film transmits light. The illustrated embodiment is different from the embodiment of FIGS. 2 to 15 not including the opaque metal layer 237 and the protrusion 240 is made of the same material as that of the black matrix 220.

A first pixel electrode 190 and a second pixel electrode 190-1 are disposed direction on the protrusion 240. The first pixel electrode 190 and the second pixel electrode 190-1 are electrically connected to the drain electrodes 175 and 175-1 through the openings 185 and 185-1. The pixel electrodes 190 and 190-1 may include a transparent conductive material such as ITO or IZO, and include a first linear electrode 191 and a second linear electrode 191-1 both extending in an oblique direction relative to the gate line 121 and the data lines 171 and 171-1. Further, both the first linear electrode 191 and the second linear electrode 191-1 in the first pixel electrode 190 and the second pixel electrode 190-1 are disposed directly on and contacting the protrusions 240.

A structure of the first pixel electrode 190 is described as follows.

The first pixel electrode 190 includes a first trunk portion disposed extending substantially parallel to the first data line 171, and a surface electrode 194 corresponding to the storage electrode 134 and overlapped thereto while being positioned at an upper part of the storage electrode 134. The first linear electrode 191 extends in an oblique direction from the first trunk portion and edges of the surface electrode 194. The first linear electrode 191 extends in a right upper direction from an upper edge of the surface electrode 194, and the first linear electrode 191 extends in a right lower direction from a lower edge of the surface electrode 194. In an exemplary embodiment, the first linear electrode 191 is disposed at an angle of about 45° relative to the gate line 121 or the data lines 171 and 171-1.

The second pixel electrode 190-1 includes an upper portion and a lower portion, both substantially in parallel to the gate line 121-1 and a side portion disposed substantially parallel with the second data line 171, which may be considered as a second trunk portion of an inverse ⊏-shaped structure. The second linear electrode 191-1 extends from the second trunk portion of an inverse ⊏-shaped structure. The second linear electrode 191-1 extends in a left lower direction toward an upper edge of the surface electrode 194, and the second linear electrode 191-1 extends in a left upper direction toward a lower edge of the surface electrode 194.

The plurality of the first linear electrode 191 and the second linear electrode 191-1 are disposed on the protrusion 240 and are disposed substantially in parallel to each other, respectively. Different voltages are applied to the first linear electrode 191 and the second linear electrode 191-1, a common voltage is applied to one side thereof, and a data voltage is applied to the other side thereof. Alternatively, a data voltage may be applied to one side thereof, and a data voltage having opposite polarity may be applied to the other side thereof.

In the illustrated embodiment, a separate part of the liquid crystal display is not disposed on a transparent substrate 210 of an upper panel facing the thin film transistor panel. The black matrix 220, the color filter 230, etc., are disposed on the lower thin film transistor array panel.

Polarizers 12 and 22 are attached to an outermost surface of the transparent substrate 110 of the thin film transistor display panel and to an outermost surface of the transparent substrate 210 the upper panel, respectively. In an exemplary embodiment, absorption axes of the polarizers 12 and 22 are disposed substantially perpendicular to each other and/or may be disposed in an angle of about 45° relative to the first linear electrode 191 and the second linear electrode 191-1.

In the illustrated embodiment, n alignment layer is advantageously not disposed at the innermost side of the thin film transistor array panel and the innermost side of the upper panel, while a liquid crystal 3 that is injected therebetween is blue phase liquid crystal.

An exemplary embodiment of a method of manufacturing a thin film transistor array panel in the liquid crystal display shown in FIG. 20 is described in detail with reference to FIGS. 21 to 24.

In FIGS. 21 to 24, the same portions as those of the exemplary embodiment of FIGS. 2 to 15 are omitted and only portions different therefrom are shown. Formation of the thin film transistor array panel up to forming the passivation layer 180 is the same as that of an exemplary embodiment of FIGS. 2 to 15 and further description thus is omitted.

Figure 21:
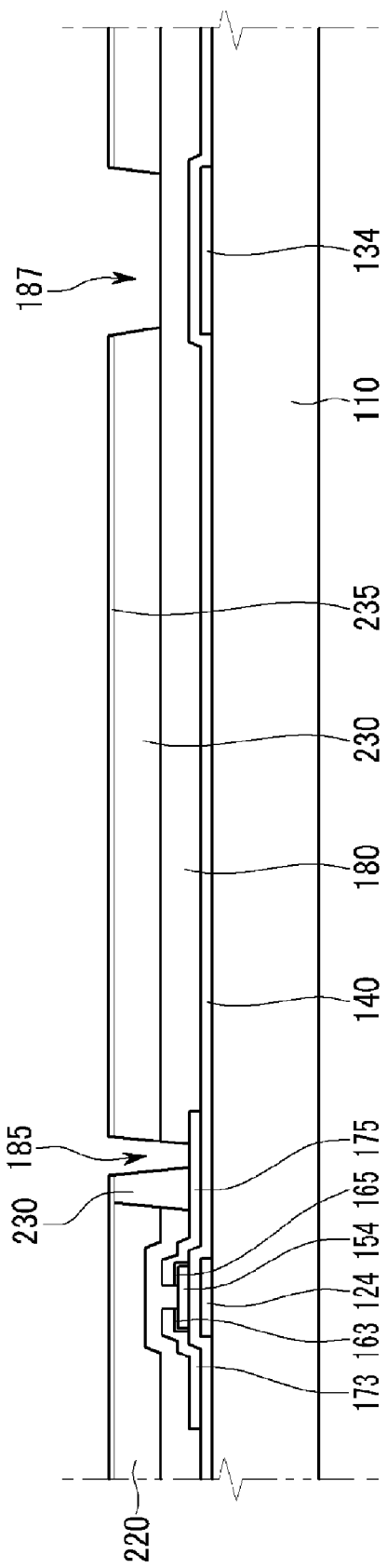
FIGS. 21 to 24 are cross-sectional views illustrating an exemplary embodiment of a process of manufacturing a thin film transistor array panel.

As shown in FIG. 21, a passivation layer 180 disposed covering the data wires 171, 173, 175, 171-1, 173-1, and 175-1 is formed, and a black matrix 220 and a color filter 230 are formed on the passivation layer 180. A capping layer 235 is formed directly on the black matrix 220 and the color filter 230. The capping layer 235, the color filter 230, and the passivation layer 180, openings 185, 185-1, and 187, respectively, are formed such as by etching.

Figure 22:
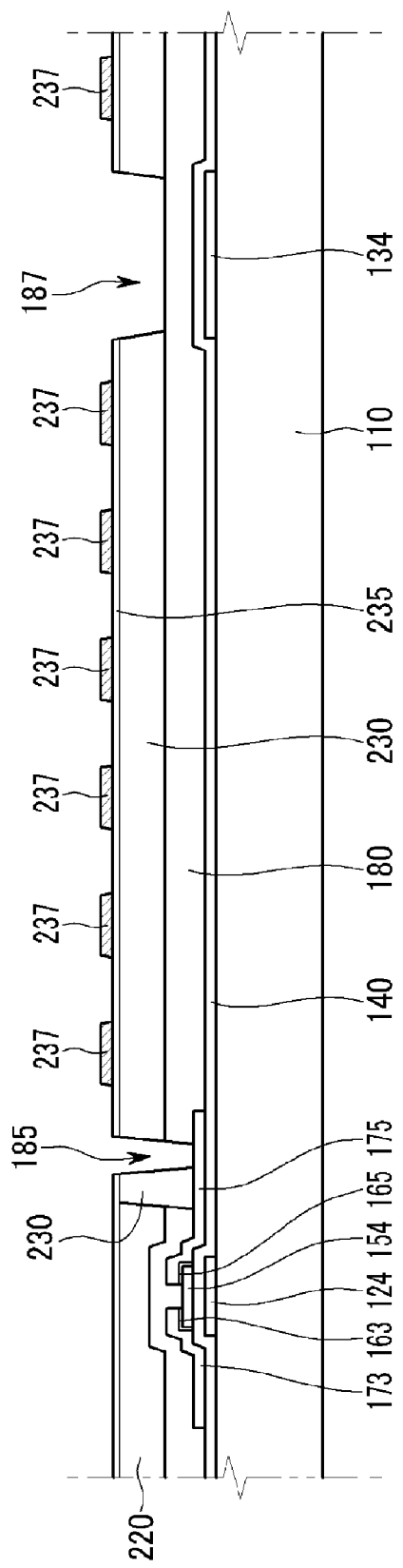
Figure 23:
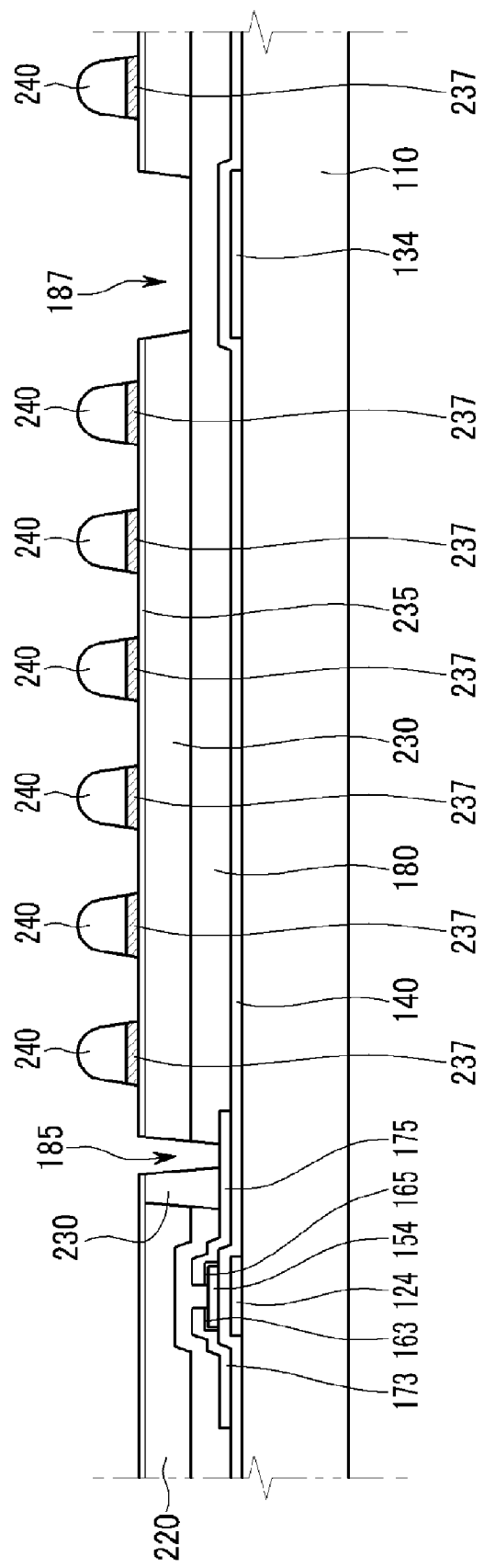

As shown in FIGS. 22 and 23, an opaque metal layer 237 and a plurality of a protrusion 240 are formed on the capping layer 235. The opaque metal layer 237 may include a metal through which light does not transmit, and the protrusions 240 may include an organic material which allows light to be transmitted. After metals in which light does not transmit are stacked, the opaque metal layer 237 may be formed through a photolithography process. Organic materials are stacked and exposure of a rear surface of the thin film transistor panel performed. Accordingly, during the exposure, light is not radiated to an organic material of a portion that is covered by the opaque metal layer 237, and light is radiated to the remaining portion. Thereafter, by performing development, the protrusion 240 is formed. In an exemplary embodiment, it is preferable that an organic material has positive photosensitivity, but may have various characteristics according to alternative embodiments.

Figure 24:
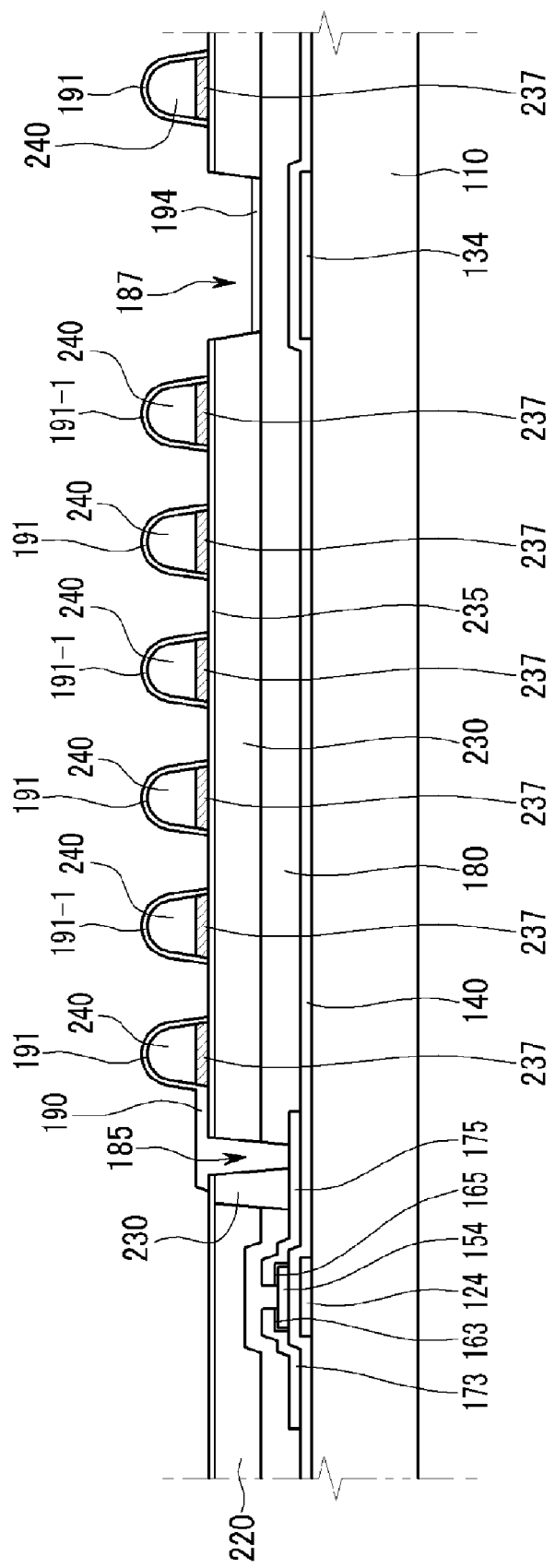

As shown in FIG. 24, the pixel electrodes 190 and 190-1 include a transparent conductive material. The first pixel electrode 190 includes a first trunk portion, a surface electrode 194, and a first linear electrode 191, and the second pixel electrode 190-1 includes an inverse ⊏-shaped second trunk portion and a second linear electrode 191-1. The first linear electrode 191 and the second linear electrode 191-1 are formed directly on and contacting the protrusion 240 and are formed in parallel to each other. In an exemplary embodiment, the first linear electrode 191 and the second linear electrode 191-1 may be obliquely formed in an angle of about 45° relative to the gate line 121 and the data lines 171 and 171-1.

A liquid crystal display having the above described structure of FIGS. 20-24 and using blue phase liquid crystal, has an electrode structure of a protrusion form. Even if a relatively lower voltage is applied for driving the liquid crystal display, liquid crystals of a relatively large region may be influenced by the lower voltage, and the liquid crystal display can be advantageously driven by the low voltage. Further, if a voltage applied to the first data line 171 and a voltage applied to the second data line 171-1 have an opposite phase, the liquid crystal display can be driven even in a lower voltage.

Additionally, the first linear electrode 191, the second linear electrode 191-1, and the protrusion 240 include a transparent material, however due to an opaque metal layer 237 formed in a lower part of the protrusion 240 and covering the protrusion 240, leakage of light from a periphery of the protrusion 240 is reduced or effectively prevented Advantageously, picture quality is improved.

In short, the illustrated embodiment of FIGS. 20 to 24 is different from the embodiment of FIGS. 2 to 15, in that the protrusion 240 is instead made of an organic material and the opaque metal layer 237 is formed under the protrusion 240.

Figure 25:
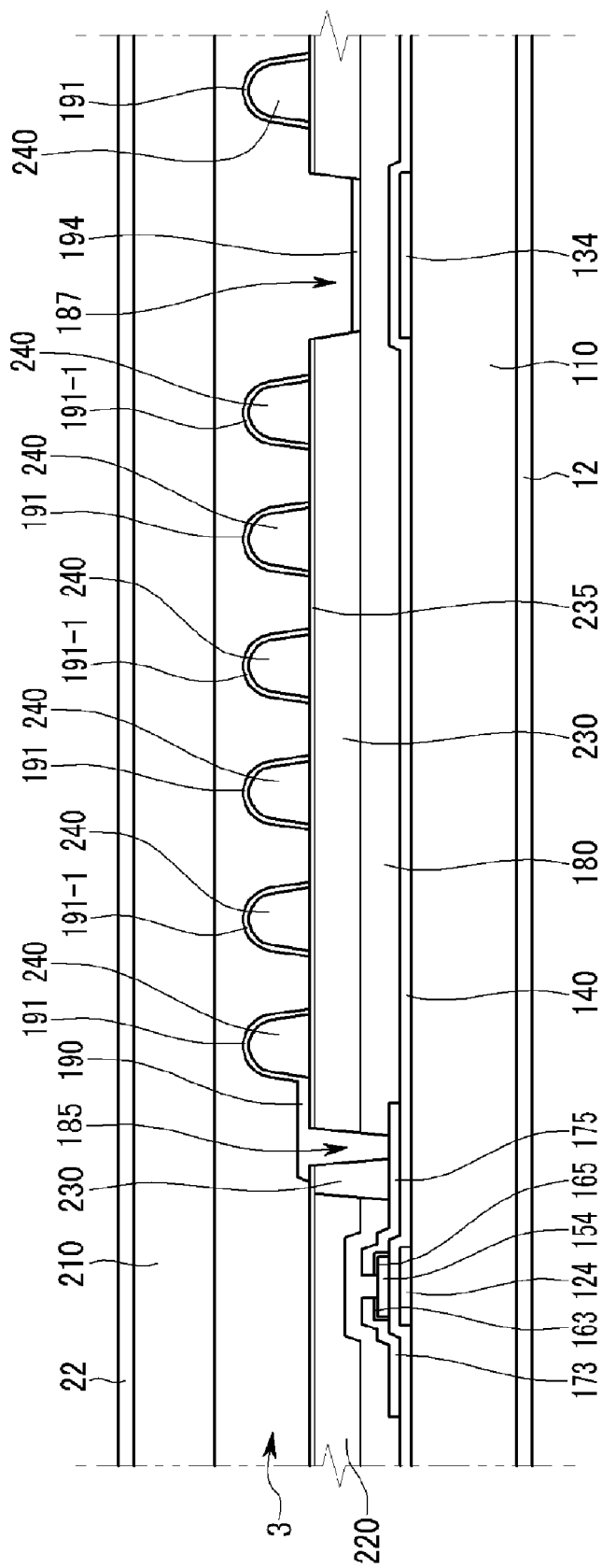
FIG. 25 is a cross-sectional view of another exemplary embodiment of the liquid crystal display taken along line III-III of FIG. 2, according to the present invention.

FIG. 25 is a cross-sectional view of another exemplary embodiment of the liquid crystal display taken along line III-III of FIG. 2 according to the present invention. In FIG. 25, a light leakage phenomenon may occur in a periphery of the protrusion 240 because polarization is broken due to different refractive indexes and refractive anisotropy when light passing through the protrusion 240 is applied to the liquid crystal layer 3. In the illustrated embodiment, light leakage is reduced or effectively prevented from occurring, by according a refractive index of the protrusion 240 made of an organic material and a refractive index of the blue phase liquid crystal layer 3. The blue phase liquid crystal layer 3 has a different refractive index according to an applied voltage, and accords a refractive index in a specific state with that of an organic material forming the protrusion 240. A refractive index of the blue phase liquid crystal layer 3 when a liquid crystal display displays black may accord (e.g., be substantially the same) with a refractive index of the protrusion 240.

First, referring to FIGS. 2 and 25, a thin film transistor display panel is described.

Gate wires 121, 124, and 124-1 and a storage capacitance line 131 are disposed on a transparent insulation substrate 110 which may include glass, and so on.

The gate wires 121 and 124 include a gate line 121 extending in a first horizontal direction, and a portion of the gate line 121 protrudes upwards in a second vertical direction in the layout view to form gate electrodes 124 and 124-1. As shown in FIG. 2, two gate electrodes 124 and 124-1 are disposed in each pixel area.

The storage capacitance line 131 is disposed substantially in parallel to the gate line 121 and includes a portion having a relatively wide width within a pixel area, thereby forming a storage electrode 134.

The gate wires 121, 124, and 124-1 and the storage capacitance line 131 are covered with the gate insulating layer 140. Semiconductor layers 154 and 154-1, which may include amorphous silicon, are disposed on the gate insulating layer 140. The semiconductor layers 154 and 154-1 are overlapped with the gate electrodes 124 and 124-1 to form a channel of a thin film transistor. Ohmic contact layers 163, 165, 163-1, and 165-1, which may include amorphous silicon in which N-type impurities such as phosphorous are doped with a high concentration, are disposed on the semiconductor layers 154 and 154-1.

Data wires 171, 173, 175, 171-1, 173-1, and 175-1 are disposed on the ohmic contact layers 163, 165, 163-1, and 165-1 and the gate insulating layer 140. The data wires 171, 173, 175, 171-1, 173-1, and 175-1 include two data lines 171 and 171-1 extending substantially in a vertical direction, source electrodes 173 and 173-1, respectively connected thereto, and drain electrodes 175 and 175-1 separated therefrom. The source electrodes 173 and 173-1 protrude upwards in the vertical direction in the layout view from the data lines 171 and 171-1 in an upper part of the gate electrodes 124 and 124-1 and have substantially a "U" shape, or a horse's hoof shape. The drain electrodes 175 and 175-1 are respectively disposed opposite to the source electrodes 173 and 173-1 relative to the channel of the thin film transistor, and a first end thereof is positioned within a "U" shape, or a horse's hoof shape of the source electrodes 173 and 173-1, while a second end opposite to the first end is extended and has a relatively wide width.

The ohmic contact layers 163, 165, 163-1, and 165-1 are disposed only in a region where the semiconductor layers 154 and 154-1 and the data wires 171, 173, 175, 171-1, 173-1, and 175-1 overlap. The gate electrode 124, the semiconductor layer 154, the source electrode 173, and the drain electrode 175 form one transistor, and the gate electrode 124-1, the semiconductor layer 154-1, the source electrode 173-1, and the drain electrode 175-1 are symmetrically formed thereto form another transistor.

A passivation layer 180 is disposed on the data wires 171, 173, 175, 171-1, 173-1, and 175-1. A color filter 230 and a black matrix 220 are both disposed on the passivation layer 180. A capping layer 235, which may include a silicone nitride film SiNx and so on, is disposed on the color filter 230 and the black matrix 220. The capping layer 235 performs a function of protecting the black matrix 220 and the color filter 230. The black matrix 220 is formed in an upper part of a transistor, the gate line 121, and the data lines 171 and 171-1. The color filter 230 is formed in a region where the black matrix 220 is not formed.

Completely through the color filter 230 and the capping layer 235, openings 185, 185-1, and 187 are formed to expose an upper part of the drain electrodes 175 and 175-1 and an upper part of the storage electrode 134. The openings 185 and 185-1 are formed to extend completely through the passivation layer 180, the color filter 230, and the capping layer 235 and expose the drain electrodes 175 and 175-1. In contrast, the opening 187 is formed only completely through the color filter 230 and the capping layer 235, and is not formed through the passivation layer 180.

A plurality of a protrusion 240 is disposed directly on the capping layer 235. In the illustrated embodiment, the protrusion 240 has a substantially bell-shaped section, but may have various cross-section shapes such as a semicircular shape, a semi-oval shape, a triangular shape, and a trapezoidal shape in alternative embodiments. It is preferable that a side surface of the protrusion 240 has a taper shape. In the present exemplary embodiment, the protrusion 240 is formed with an organic film, and the organic film transmits light. The organic film for forming the protrusion 240 has the same refractive index as that in a specific state of the blue phase liquid crystal layer 3. In the illustrated embodiment, the specific state of the blue phase liquid crystal layer 3 may be a state when a liquid crystal display displays black.

A first pixel electrode 190 and a second pixel electrode 190-1 are disposed directly on the protrusion 240. The first pixel electrode 190 and the second pixel electrode 190-1 are electrically connected to the drain electrodes 175 and 175-1 through the openings 185 and 185-1, respectively. The pixel electrodes 190 and 190-1 may include a transparent conductive material such as ITO or IZO, and include a first linear electrode 191 and a second linear electrode 191-1 extending in an oblique direction relative to the gate line 121 and the data lines 171 and 171-1. Further, both the first linear electrode 191 and the second linear electrode 191-1 in the first pixel electrode 190 and the second pixel electrode 190-1 are disposed directly on and overlapping substantially all surfaces of the protrusions 240, except for the lower surface of the protrusions 240 contacting the capping layer 235.

A structure of the first pixel electrode 190 is described as follows.

The first pixel electrode 190 includes a first trunk portion disposed substantially parallel with the first data line 171, and a surface electrode 194 corresponding to the storage electrode 134 and overlapped thereto at an upper part of the storage electrode 134. The first linear electrode 191 extends in an oblique direction from the first trunk portion and edges of the surface electrode 194. The first linear electrode 191 extends in a right upper direction from an upper edge of the surface electrode 194, and the first linear electrode 191 extends in a right lower direction from a lower edge of the surface electrode 194. In an exemplary embodiment, the first linear electrode 191 is formed in an angle of about 45° relative to the gate line 121 or the data lines 171 and 171-1.

The second pixel electrode 190-1 includes an upper portion and a lower portion, both substantially in parallel to the gate line 121 and a side portion disposed substantially in parallel with the second data line 171, thereby including a second trunk portion of an inverse ⊏--shaped structure. The second linear electrode 191-1 extends from the second trunk portion of an inverse ⊏--shaped structure, and the second linear electrode 191-1 extends in a left lower direction toward an upper edge of the surface electrode 194, and the second linear electrode 191-1 extends in a left upper direction toward a lower edge of the surface electrode 194.

The plurality of the first linear electrode 191 and the second linear electrode 191-1 are disposed on the protrusion 240 and are formed substantially in parallel to each other, respectively. Different voltages are applied to the first linear electrode 191 and the second linear electrode 191-1. In an exemplary embodiment, a common voltage is applied to one side thereof, and a data voltage is applied to the other side thereof. Alternatively, a data voltage may be applied to one side thereof, and a data voltage having opposite polarity may be applied to the other side thereof.

In the illustrated embodiment, a separate part of the liquid crystal display is not formed on a transparent substrate 210 of the upper panel facing the thin film transistor panel. The black matrix 220, the color filter 230, etc., are disposed on the lower thin film transistor array panel.

Polarizers 12 and 22 are attached to an outermost side of the transparent substrate 110 of the thin film transistor display panel and to an outermost side of the transparent substrate 210 of the upper panel, respectively. In an exemplary embodiment, absorption axes of the polarizers 12 and 22 are formed substantially perpendicular to each other and/or may be formed in an angle of about 45° relative to the first linear electrode 191 and the second linear electrode 191-1.

In the illustrated embodiment, an alignment layer is advantageously not disposed at the innermost side of the thin film transistor array panel and at the innermost side of the upper panel, while a liquid crystal 3 is injected therebetween is blue phase liquid crystal. A refractive index of a specific state of the blue phase liquid crystal 3 is substantially the same as that of an organic material for forming the protrusion 240. In the illustrated embodiment of FIG. 25, the specific state of the liquid crystal display may be a state when a liquid crystal display displays black.

A liquid crystal display having the above described structure and materials of FIG. 25 and using blue phase liquid crystal, has an electrode structure of a protrusion form. Even if a relatively lower voltage is applied for driving the liquid crystal display, liquid crystals of a relatively large region may still be influenced, and the liquid crystal display can be advantageously driven in the low voltage. Further, if a voltage applied to the first data line 171 and a voltage applied to the second data line 171-1 have an opposite phase, the liquid crystal display can be driven even in a lower voltage.

Additionally, since a refractive index of an organic material forming the protrusion 240 and a refractive index in a specific state of the blue phase liquid crystal layer 3 are substantially the same, when the liquid crystal display operates in the specific state, leakage of light from a periphery of the protrusion 240 is reduced or effectively prevented. In the illustrated embodiment, the specific state may be a state when the liquid crystal display displays black, and light may be leaked in a state except for a specific state. Since a relatively small quantity of light is leaked, picture quality is advantageously improved.

In short, the illustrated embodiment of FIG. 25 is different from the embodiment of FIGS. 2 to 15, from the embodiment of FIGS. 16 to 19, and from exemplary embodiment of FIGS. 20 to 24, in that the protrusion 240 of FIG. 25 are made of an organic material and a reflective index of an organic material forming the protrusion 240 is the same as that in a specific state of blue phase liquid crystal 3.

FIGS. 26 to 41 show an exemplary embodiment of a process of forming the protrusion 240 and the pixel electrodes 191 and 191-1, using exposure of a rear surface.

FIGS. 26 to 31 are cross-sectional views according to an exemplary embodiment of a process of forming the pixel electrodes 191 and 191-1 on the protrusion 240, using the protrusion 240 including an organic material as a mask.

Figure 32:
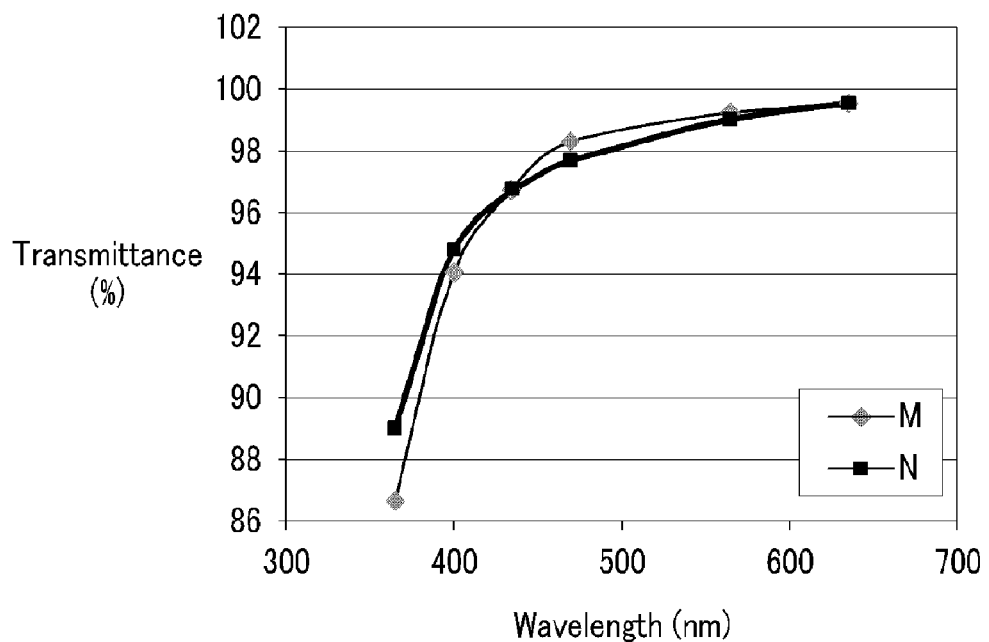
FIGS. 32 and 33 are graphs illustrating a transmittance to a wavelength of an organic material.
Figure 33:
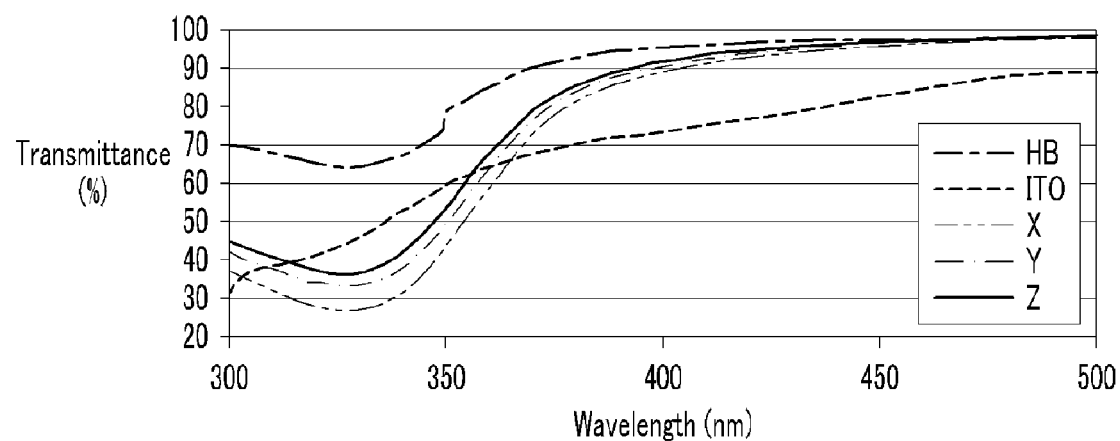

FIGS. 32 and 33 are graphs illustrating exemplary embodiments of a transmittance to a wavelength of an organic material.

In the embodiment of FIGS. 2 to 15, because the protrusion 225 is made of a material for blocking light, the pixel electrodes 191 and 191-1 can be patterned through exposure of a rear surface. Referring to FIGS. 26 to 31, an exemplary embodiment of a method of patterning the pixel electrodes 191 and 191-1 using the protrusion 240 including an organic material as a mask through exposure of a rear surface is described hereinafter.

First, a transmittance to a wavelength of an organic material is described using graphs of FIGS. 32 and 33.

FIG. 32 shows a transmittance to a wavelength of two organic materials. In FIG. 32, a material M is SS-015 (a product code name), which is an organic material, and a material N is PC-411B (a product code name), which is an organic material.

As shown in FIG. 32, in a visible region, a light transmittance of an organic material exceeds 95%, but in an ultraviolet ray region, a light transmittance of an organic material abruptly drops. FIG. 32 shows that as a wavelength of ultraviolet rays is small, a transmittance is lowered, and thus an organic material can be used as a mask for ultraviolet rays.

Particularly, FIG. 33 shows that when a predetermined processing for an organic material is performed, a transmittance is further lowered.

In FIG. 33, HB shows a case where an organic material is hard-baked, ITO shows a case where ITO is coated to an organic material, X shows a case where a surface treatment of an organic material is performed by N-methylpyrrolidone (NMP), which is a strong alkali organic solvent, Y shows a case where a surface treatment of an organic material is performed by metyl n-butyl ketone (MBK), which is an organic solvent for a resin, and Z shows a case where a surface treatment of an organic material is performed by acetone. Further, the organic material that is used in FIG. 33 is PC-411B.

As shown in FIG. 33, even in a case where only a hard baking (HB) processing of an organic material is performed, a light transmittance reduces in an ultraviolet rays region. However, in a case where a surface treatment of an organic material is performed with acetone, NMP, MBK, and so on, a transmittance drops to 40% or low, so that an organic material can be used as a mask. Further, FIG. 33 shows a transmittance when ITO is additionally coated in an organic material, and shows that a transmittance is further lowered when ITO additionally is coated. Therefore, because a transmittance is further lowered in a structure in which ITO is coated on an organic material, the organic material can perform a function as a mask for ultraviolet rays. A method of performing a surface treatment of an organic material and stacking ITO layers thereon may be used.

As a result, only an organic material may be used as a mask, however by performing a surface treatment of the organic material, or by additionally stacking an ITO layer on the organic material, the organic material has a lower transmittance and thus the organic material may be used as a mask.

A method of using an organic material as a mask is described in detail with reference to FIGS. 26 to 31. FIGS. 26 to 31 show the protrusion 240 is directly formed on the substrate 110. However, another layer may be formed between the protrusion 240 and the substrate 110, as shown in FIGS. 18 and 19.

Figure 26:
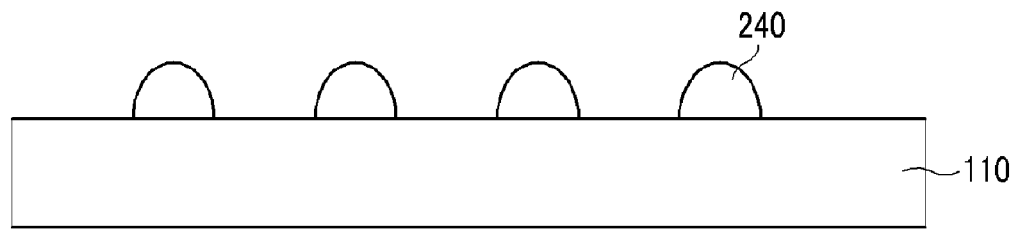
FIGS. 26 to 31 are cross-sectional views illustrated an exemplary embodiment of a process of forming a pixel electrode on a protrusion, using a protrusion including an organic material as a mask.

As shown in FIG. 26, the protrusion 240 including an organic material is formed on the substrate 110. In an exemplary embodiment, the protrusion 240 can be formed by stacking an organic material and exposing and developing an upper part thereof using a mask (not shown).

Figure 27:
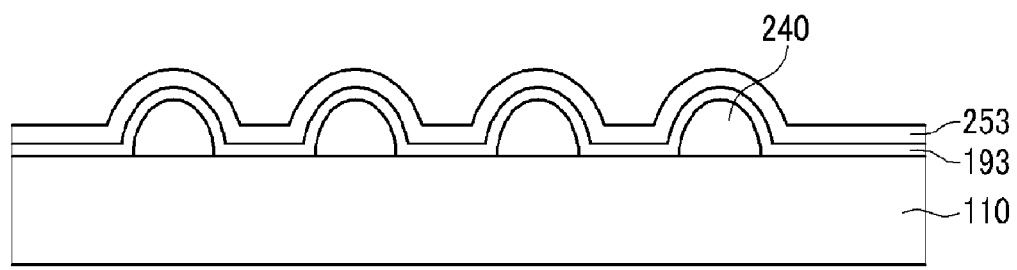

As shown in FIG. 27, an ITO layer 193 and a photoresist layer 253 are sequentially disposed on the protrusion 240 and the substrate 110. In an exemplary embodiment, the ITO layer 193 may be a transparent conductive layer and may be made of IZO. As in the embodiment of FIG. 25, it is preferable that a refractive index of an organic material is the same as that of a specific state of the blue phase liquid crystal layer 3.

Figure 28:
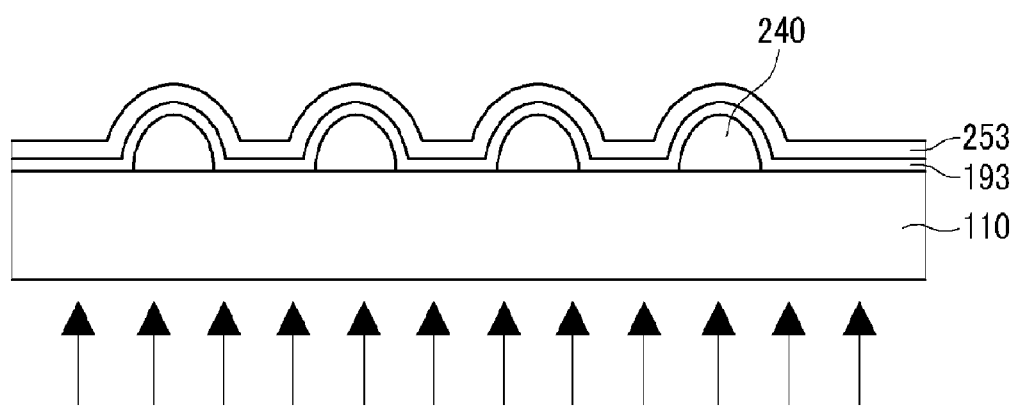

As shown in FIG. 28, exposure of a rear surface is performed using ultraviolet rays in a lower part of the substrate 110, as indicated by the upward pointing arrows. As shown in FIGS. 32 and 33, because the protrusion 240 has a lower transmittance, the protrusion 240 can be essentially used as a mask, and thus a small quantity of light is applied to the photoresist layer 253 formed in an upper part of the protrusion 240, so that a property thereof does not change. In an exemplary embodiment, it is preferable that the photoresist layer 253 has positive characteristics. Further, the protrusion 240 may be made of an organic material having a low transmittance of ultraviolet rays, or a surface treatment for lowering a transmittance may be performed in the protrusion 240.

Figure 29:
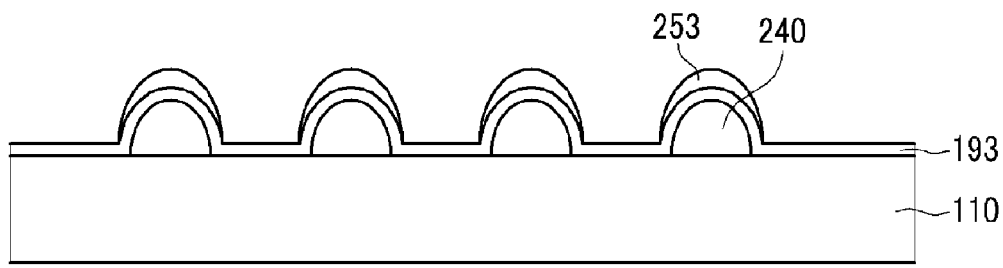

As shown in FIG. 29, the photoresist layer 253 is developed. Therefore, the photoresist layer 253 of a region exposed to light from the rear of the substrate 110 is removed, and the photoresist layer 253 whose property does not change due to application of a small quantity of light remains.

Figure 30:
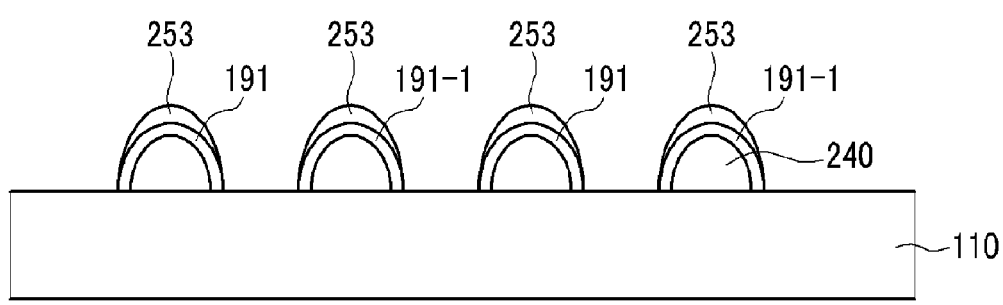

As shown in FIG. 30, by etching the ITO layer 193 using the remained photoresist layer 253 as a mask, the pixel electrodes 191 and 191-1 are formed.

Figure 31:
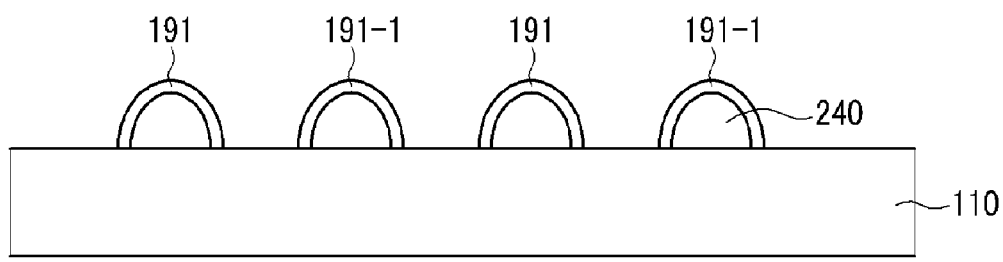

As shown in FIG. 31, by removing the photoresist layer 253, a pattern of the pixel electrodes 191 and 191-1 is completed.

Since the pixel electrodes 191 and 191-1 do not have photosensitivity, the pixel electrodes 191 and 191-1 are patterned after additionally forming the photoresist layer 253. However, when a material having photosensitivity is patterned, a pattern can be directly formed by developing after exposing a rear surface without forming the photoresist layer 253.

FIGS. 34 to 41 are cross-sectional views illustrating an exemplary embodiment of a process sequence of FIGS. 22 to 24.

FIGS. 34 to 41 show an opaque metal layer 237 formed directly on the substrate 110. However, as shown in FIGS. 22 to 24, a separate layer may be formed between the substrate 110 and the opaque metal layer 237. According to an embodiment, which is different from FIGS. 22 to 24, the opaque metal layer 237 may be formed directly on the substrate 110. In this embodiment, the opaque metal layer 237 and the gate lines 121 may be formed at the same time with the same material, and a separate layer may be formed between the opaque metal layer 237 and the protrusion 240.

Figure 34:
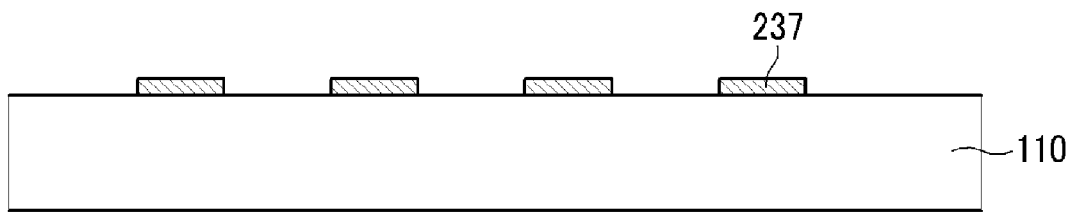
FIGS. 34 to 41 are cross-sectional views illustrating an exemplary embodiment of a method of manufacturing a thin film transistor array panel of FIGS. 22 to 24.

As shown in FIG. 34, a pattern of the opaque metal layer 237 is formed on the substrate 110. After sequentially stacking an opaque material and a photoresist 243, a photoresist pattern is formed by exposing and developing in an upper part thereof using a mask, and then an opaque metal layer 237 can be formed by etching using the photoresist pattern as a mask. In an exemplary embodiment, it is preferable that the photoresist 243 has positive characteristics.

Figure 35:
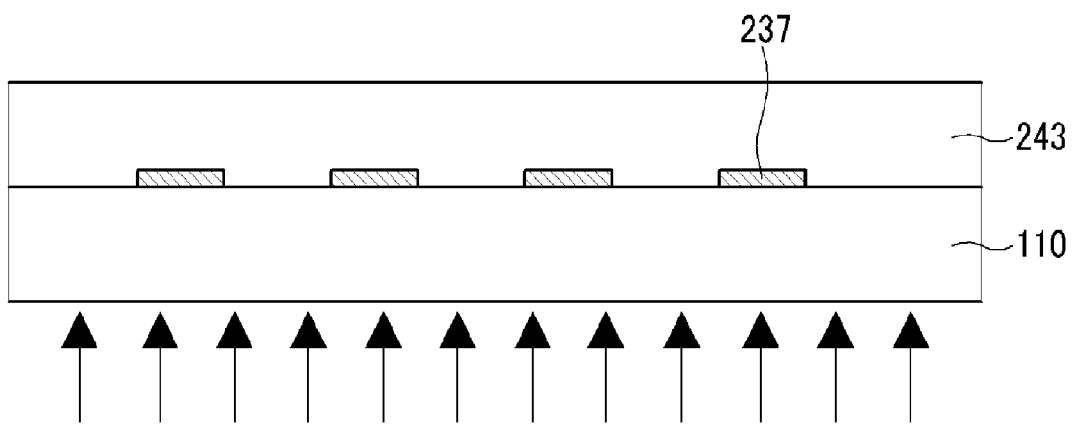

As shown in FIG. 35, organic materials for a protrusion are stacked and are exposed from the rear surface, as indicated by the upward pointing arrows under the substrate 110. Due to the opaque metal layer 237, the photoresist 243 formed on the opaque metal layer 237 is not exposed and only a photoresist 243 around the opaque metal layer 237 is exposed.

Figure 36:
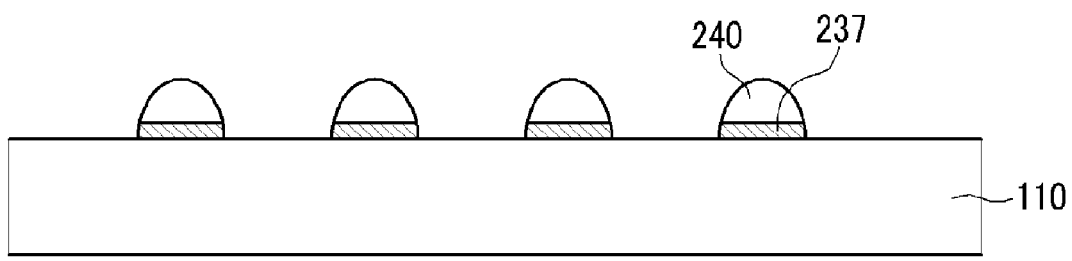

A pattern of a protrusion 240 is formed by developing, as shown in FIG. 36.

Figure 37:
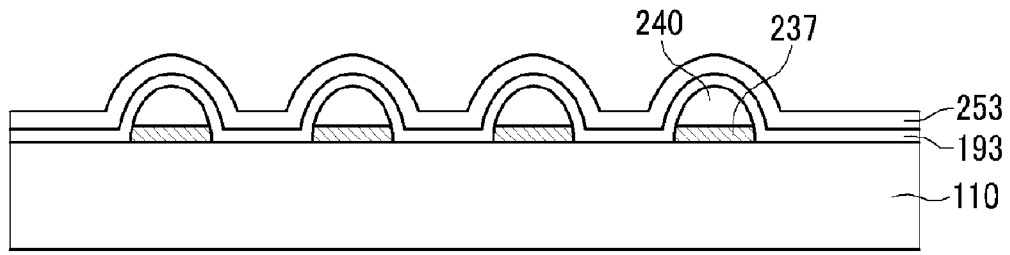

As shown in FIG. 37, the ITO layer 193 and the photoresist layer 253 are sequentially stacked on the protrusion 240 and the substrate 110. In an exemplary embodiment, the ITO layer 193 includes a transparent conductive layer and may be made of IZO.

Figure 38:
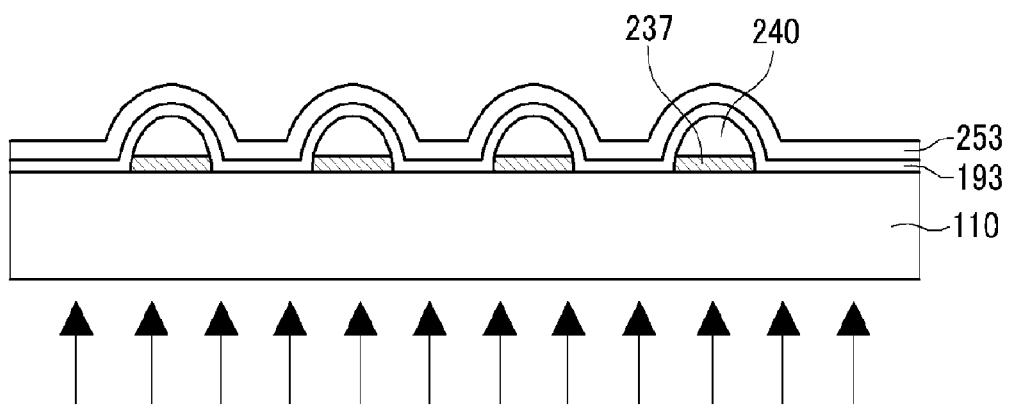

As shown in FIG. 38, exposure of a rear surface is performed in a lower part of the substrate 110, as indicated by the upward pointing arrows under the substrate 110. It is preferable that the photoresist layer 253 has positive characteristics.

Figure 39:
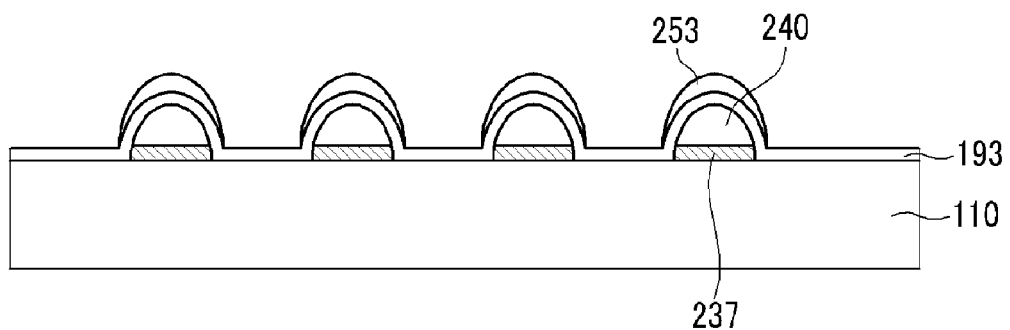

As shown in FIG. 39, the photoresist layer 253 is developed. Therefore, the photoresist layer 253 of a region exposed by light is removed.

Figure 40:
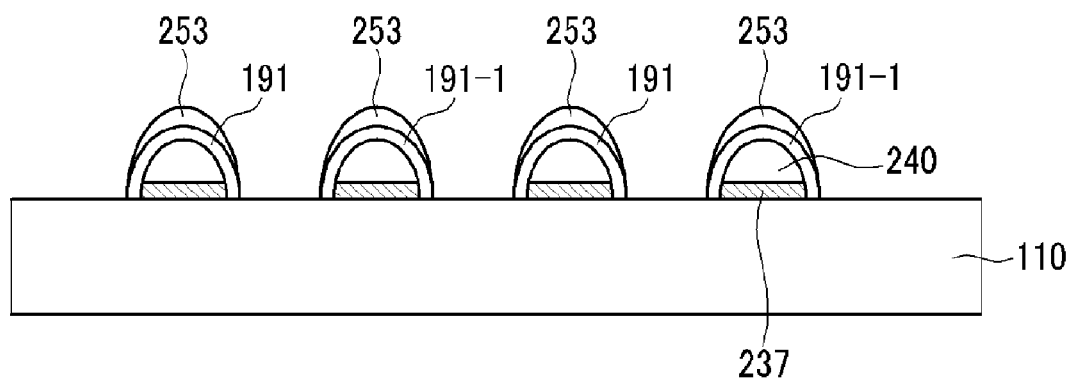

As shown in FIG. 40, by etching the ITO layer 193 using the remained photoresist layer 253 as a mask, the pixel electrodes 191 and 191-1 are formed.

Figure 41:
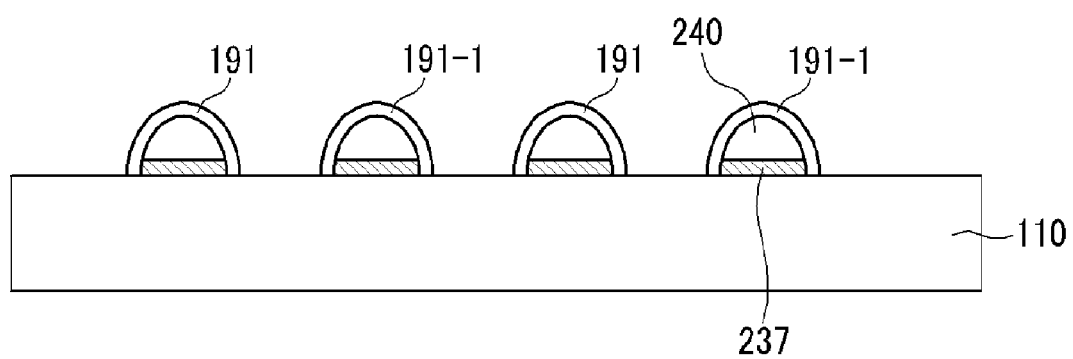

As shown in FIG. 41, by removing the photoresist layer 253, a pattern of the pixel electrodes 191 and 191-1 is completed.

Since the pixel electrodes 191 and 191-1 do not have photosensitivity, the pixel electrodes 191 and 191-1 are patterned by additionally forming the photoresist layer 253. However when a material having photosensitivity is patterned, a pattern can be directly formed by developing after exposing a rear surface without forming the photoresist layer 253.

In the foregoing description, a method of exposing a rear surface is described in detail with reference to FIGS. 26 to 41. Alternatively, a pattern may be formed with various methods. Further, even when using ultraviolet rays, an organic material can be used as a mask, and this is not limited to a liquid crystal display.

Figure 42:
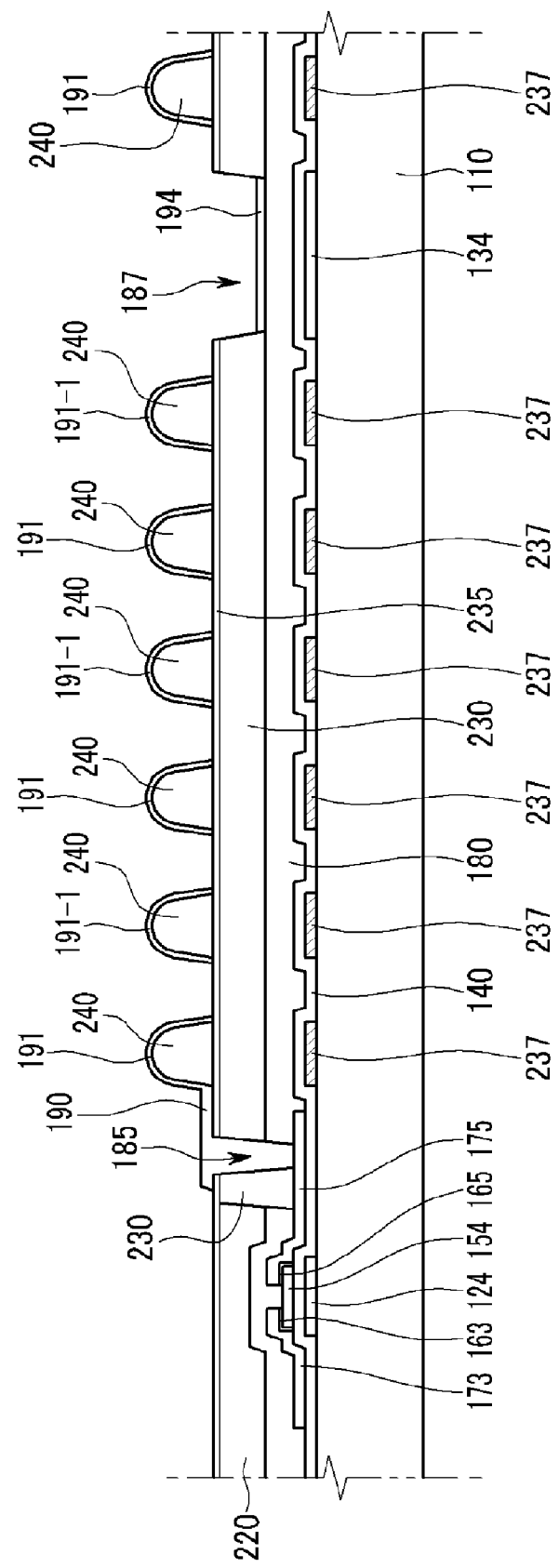
FIG. 42 is a cross-sectional view of another exemplary embodiment of the liquid crystal display taken along line III-III of FIG. 2, according to the present invention.

FIG. 42 is a cross-sectional view of another exemplary embodiment of the liquid crystal display taken along line III-III of FIG. 2, according to the present invention.

FIG. 42 is different from FIG. 20, since the opaque metal layer 237 and the gate lines 121 are formed at the same time with the same material. The gate lines 121 and the opaque metal layer 237 are disposed on the substrate 110. By forming the opaque metal layer 237 and the gate lines 121 together, a photolithography process is lessen.

According to an embodiment, a separate layer may be formed between the opaque metal layer 237 and the protrusion 240.

In short, in the present invention, by allowing a pixel electrode to have a structure overlapping with a protrusion, transmission of light is reduced or effectively prevented through a corresponding protrusion and the pixel electrode formed thereon, or by allowing a refractive index of the corresponding protrusion and a refractive index of blue phase liquid crystal to have substantially the same value, light leaked to a periphery of a pixel electrode is reduced or effectively prevented, and various exemplary embodiments may exist.

Further, in the present invention, a method of forming an upper pattern by stacking using an organic material and exposing a rear surface is described. That is, an organic material can be used as a mask when ultraviolet rays are used.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first substrate;
a gate line disposed on the first substrate and extending in a first direction;
first and second data lines extending in a second direction, the first and second data lines being electrically insulated from and intersecting the gate line;
a first thin film transistor connected to the gate line and the first data line;
a second thin film transistor connected to the gate line and the second data line;
a passivation layer overlapping the first and second thin film transistors;
a black matrix disposed on the passivation layer and in a first region corresponding to the gate line, the first and second data lines, and the first and second thin film transistors;
a color filter disposed on the passivation layer and positioned at a second region where the black matrix is not disposed;
a protrusion disposed on the color filter;
a first pixel electrode including a first linear electrode disposed on the protrusion and connected to the first thin film transistor;
a second pixel electrode including a second linear electrode disposed on the protrusion and connected to the second thin film transistor;
a second substrate disposed facing the first substrate; and
blue phase liquid crystal disposed between the first substrate and the second substrate,
wherein light is not transmitted through the first linear electrode and the protrusion, and light is not transmitted through the second linear electrode and the protrusion.

2. The liquid crystal display of claim 1, wherein the protrusion includes a same material as that of the black matrix.

3. The liquid crystal display of claim 1, wherein the first pixel electrode including the first linear protrusion and the second pixel electrode including the second linear protrusion, includes an opaque conductor.

4. The liquid crystal display of claim 3, further comprising a capping layer overlapping the black matrix and the color filter.

5. The liquid crystal display of claim 1, further comprising an opaque metal layer disposed between the protrusion and the color filter.

6. The liquid crystal display of claim 5, further comprising a capping layer overlapping the black matrix and the color filter, and disposed between the opaque metal layer and the color filter.

7. The liquid crystal display of claim 1, wherein the protrusion has a cross-section of a bell shape, or one of a semicircular cross-section, a semi-oval cross-section, a triangular cross-section, and a trapezoidal cross-section.

8. The liquid crystal display of claim 1, wherein a side surface of the protrusion is tapered.

9. The liquid crystal display of claim 1, wherein before an electric field is applied, the blue phase liquid crystal has optically isotropic characteristics, and when the electric field is applied, the blue phase liquid crystal has optically anisotropic characteristics.

10. The liquid crystal display of claim 1, wherein the first pixel electrode and the second pixel electrode are electrically connected to the first thin film transistor and the second thin film transistor through first and second contact holes, respectively, wherein
the first contact hole extends completely through the color filter and the passivation layer, and exposes a drain electrode of the first thin film transistor, and
the second contact hole extends completely through the color filter and the passivation layer and exposes a drain electrode of the second thin film transistor.

11. The liquid crystal display of claim 1, wherein a common voltage is applied to the second pixel electrode, when a data voltage is applied to the first pixel electrode.

12. The liquid crystal display of claim 1, wherein a data voltage is applied to the first pixel electrode, when a voltage having a polarity opposite to the data voltage and a same magnitude as the data voltage, is applied to the second pixel electrode.

13. The liquid crystal display of claim 1, wherein each of the protrusion and the first and second linear electrodes, are obliquely disposed relative to the gate line and the first and second data lines.

14. The liquid crystal display of claim 13, wherein the protrusion and the first and second linear electrodes are disposed at an angle of about 45° relative to the gate line.

15. The liquid crystal display of claim 1, further comprising a first polarizer and a second polarizer disposed on an outside of the first substrate and the second substrate, respectively,
the first polarizer and the second polarizer having a transmissive axis, and
the transmissive axis of the first polarizer and the transmissive axis of the second polarizer have an angle of about 45° relative to the first linear electrode or the second linear electrode.

16. The liquid crystal display of claim 1, further comprising a storage electrode line disposed in parallel to the gate line, and including a storage electrode.

17. The liquid crystal display of claim 16, wherein the first pixel electrode includes a first trunk portion disposed parallel with the first data line, and a surface electrode corresponding to the first linear electrode and the storage electrode, and
the first linear electrode extends inclined from the trunk portion and the surface electrode.

18. The liquid crystal display of claim 17, wherein the second pixel electrode includes an inverse "U"-shaped second trunk portion and the second linear electrode, and
the second linear electrode extends inclined from the inverse "U"-shaped trunk portion.

19. The liquid crystal display of claim 1, further comprising an opaque metal layer disposed on the first substrate.

20. A liquid crystal display comprising:
a first substrate;
a gate line disposed on the first substrate and extending in a first direction;
first and second data lines extending in a second direction, the first and second data lines electrically insulated from and intersecting the gate line;
a first thin film transistor connected to the gate line and the first data line;
a second thin film transistor connected to the gate line and the second data line;
a passivation layer overlapping the first and second thin film transistors;
a black matrix disposed on the passivation layer and in a first region corresponding to the gate line, the first and second data lines, and the first and second thin film transistors;

a color filter disposed on the passivation layer and positioned at a second region where the black matrix is not disposed;

a protrusion disposed on the color filter and including an organic layer;

a first pixel electrode including a first linear electrode disposed on the protrusion and connected to the first thin film transistor;

a second pixel electrode including a second linear electrode disposed on the protrusion and connected to the second thin film transistor;

a second substrate disposed facing the first substrate; and blue phase liquid crystal disposed between the first substrate and the second substrate, wherein a refractive index in a specific state of the blue phase liquid crystal, is substantially the same as a refractive index of the protrusion.

21. The liquid crystal display of claim 20, wherein a refractive index of the blue phase liquid crystal when the liquid crystal display displays black, is substantially the same as a refractive index of the protrusion.

22. The liquid crystal display of claim 20, further comprising an opaque metal layer disposed on the first substrate.

* * * * *